United States Patent
Park et al.

(10) Patent No.: US 9,385,850 B2
(45) Date of Patent: Jul. 5, 2016

(54) METHOD FOR TRANSMITTING CONTROL INFORMATION OF TRANSCEIVING POINT AND SAID TRANSCEIVING POINT, METHOD FOR RECEIVING CONTROL INFORMATION FOR TERMINAL AND SAID TERMINAL

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/428,234

(22) PCT Filed: Jul. 30, 2013

(86) PCT No.: PCT/KR2013/006816
§ 371 (c)(1),
(2) Date: Mar. 13, 2015

(87) PCT Pub. No.: WO2014/042356
PCT Pub. Date: Mar. 20, 2014

(65) Prior Publication Data
US 2015/0282127 A1    Oct. 1, 2015

(30) Foreign Application Priority Data

Sep. 14, 2012 (KR) .......... 10-2012-0102452
Sep. 18, 2012 (KR) .......... 10-2012-0103584
Oct. 8, 2012 (KR) .......... 10-2012-0111501
Dec. 12, 2012 (KR) .......... 10-2012-0144531
Dec. 13, 2012 (KR) .......... 10-2012-0145368

(51) Int. Cl.
*H04W 4/00* (2009.01)
*H04L 5/00* (2006.01)

(52) U.S. Cl.
CPC .................. *H04L 5/0053* (2013.01)

(58) Field of Classification Search
None
See application file for complete search history.

(56) References Cited

U.S. PATENT DOCUMENTS

| | | | |
|---|---|---|---|
| 9,173,215 | B2 | 10/2015 | Park et al. |
| 2011/0312363 | A1 | 12/2011 | Kolding et al. |
| 2012/0002740 | A1 | 1/2012 | Han et al. |
| 2012/0220327 | A1 | 8/2012 | Lee, II et al. |
| 2013/0194931 | A1 | 8/2013 | Lee et al. |
| 2013/0242882 | A1 | 9/2013 | Blankenship et al. |

(Continued)

FOREIGN PATENT DOCUMENTS

JP    2014-023108 A    2/2014

OTHER PUBLICATIONS

Korean Intellectual Property Office, International Search Report for International Application No. PCT/ KR2013/008191, Dec. 23, 2013.
Korean Intellectual Property Office, Written Opinion of the International Searching Authority for International Application No. PCT/KR2013/008191, Dec. 23, 2013.
NEC Group, "ePDCCH search space design", R1-123253, 3GPP TSG RAN WG1 Meeting #70, Qingdao, China, Aug. 13-17, 2012, pp. 1-6.

(Continued)

*Primary Examiner* — Phirin Sam
(74) *Attorney, Agent, or Firm* — IP Legal Services, LLC

(57) ABSTRACT

Provided are a control information transmission method of a transmission/reception point for a User Equipment that receives downlink control information through a downlink control channel introduced to a data area, a control information reception method of a User Equipment, and apparatuses thereto. Also, a resource mapping method and apparatus for an enhanced Control Channel Element (ECCE) of an EPDCCH is provided.

12 Claims, 18 Drawing Sheets

(56) References Cited

U.S. PATENT DOCUMENTS

| | | | |
|---|---|---|---|
| 2013/0272214 A1 | 10/2013 | Zhu et al. | |
| 2013/0301562 A1 | 11/2013 | Liao et al. | |
| 2014/0036810 A1* | 2/2014 | Harrison | H04W 72/042 370/329 |
| 2014/0078987 A1 | 3/2014 | Park et al. | |
| 2014/0293957 A1 | 10/2014 | Chun et al. | |
| 2014/0355451 A1* | 12/2014 | Kim | H04L 1/0026 370/241 |
| 2015/0003349 A1* | 1/2015 | Kim | H04W 72/042 370/329 |
| 2015/0085773 A1 | 3/2015 | Seo et al. | |
| 2015/0139109 A1* | 5/2015 | Seo | H04W 72/042 370/329 |
| 2015/0146639 A1 | 5/2015 | Seo et al. | |
| 2015/0181569 A1 | 6/2015 | Kim et al. | |
| 2015/0181573 A1 | 6/2015 | Takeda et al. | |
| 2015/0229455 A1* | 8/2015 | Seo | H04L 1/1861 370/329 |
| 2016/0037498 A1* | 2/2016 | Chen | H04W 72/042 370/329 |

OTHER PUBLICATIONS

Korean Intellectual Property Office, International Search Report for International Application No. PCT/ KR2013/008329, Dec. 27, 2013.
Korean Intellectual Property Office, Written Opinion of the International Searching Authority for International Application No. PCT/ KR2013/008329, Dec. 27, 2013.
Panasonic, "RE mapping for ePDCCH", R1-123287, 3GPP TSG RAN WG1 Meeting #70, Qingdao, China, Aug. 13-17, 2012, pp. 1-8.
Mediatek Inc., "Necessity of Multiplexing of Localized and Distributed ePDCCH Parts in the Same PRBs", R1-122168, 3GPP TSG-RAN WG1 #69, Prague, Czech, May 21-May 25, 2012, pp. 1-3.
Renesas Mobile Europe Ltd, "Remaining details on ePDCCH antenna port association", R1- 123587, 3GPP TSG-RAN WG1 Meeting #70, Qingdao, China, May 13-17, 2012, pp. 1-6.
Fujitsu, "Definition of eREG and eCCE", R1-122068, 3GPP TSG RAN WG1 Meeting #69, Prague, Czech Republic, May 21-25, 2012, pp. 1-4.
Interdigital Communications, LLC, On ePDCCH Multiplexing', R1-121319, 3GPP TSG RAN WG1 Meeting #68bis, Jeju, Korea, Mar. 26-30, 2012, pp. 1-5.

* cited by examiner

METHOD FOR TRANSMITTING CONTROL INFORMATION OF TRANSCEIVING POINT AND SAID TRANSCEIVING POINT, METHOD FOR RECEIVING CONTROL INFORMATION FOR TERMINAL AND SAID TERMINAL

CROSS REFERENCE TO RELATED APPLICATIONS

This application is a National Stage Patent Application of PCT International Patent Application No. PCT/KR2013/006816 (filed on Jul. 30, 2013) under 35 U.S.C. §371, which claims priority to Korean Patent Application Nos. 10-2012-0102452 (filed on Sep. 14, 2012), 10-2012-0103584 (filed on Sep. 18, 2012), 10-2012-0111501 (filed on Oct. 8, 2012), 10-2012-0144531 (filed on Dec. 12, 2012), and 10-2012-0145368 (filed on Dec. 13, 2012), the teachings of which are incorporated herein in their entireties by reference.

TECHNICAL FIELD

The present disclosure relates to a control information transmission method of a transmission/reception point for a User Equipment (UE) that receives downlink control information through a downlink control channel introduced to a data area, a control information reception method of a UE, and apparatuses thereof.

BACKGROUND ART

A wireless communication system is designed to transmit data to a large number of users. There are limits on increasing system capacity due to limited control area resources. In order to increase system capacity, it needs to transmit downlink control information through a downlink control channel located in a data area.

There is a demand for a resource allocation method for a new control channel element (e.g., Enhanced Control Channel Element) for allocation of a downlink control channel located in a data area, like a control channel element for allocation of a downlink control channel in an existing control area.

DETAILED DESCRIPTION OF THE INVENTION

Technical Solution

The present disclosure provides an Enhanced Control Channel Element (ECCE)/Enhanced Resource Element Group (EREG) mapping method for downlink control channel transmission in a data area. In addition, the present disclosure provides a method and apparatus for indexing an ECCE in a localized type Enhanced Physical Downlink Control Channel (EPDCCH) set and a distributed type EPDCCH set.

The present disclosure provides a method for a transmission/reception point to transmit control information to a User Equipment (UE) through a data area of resource block pairs (e.g., Physical Resource Block pairs) of a subframe. The method may include configuring at least one localized downlink control channel set with respect to a few of the resource block pairs where a localized downlink control channel includes an enhanced physical downlink control channel, and configuring at least one distributed downlink control channel set with respect to another few of the resource block pairs; allocating control channel elements to 4 resource element groups having different indices and having an identical remainder obtained after dividing a corresponding resource element group index by 4 or to 8 resource element groups having different indices and having an identical remainder obtained after dividing a corresponding resource element group index by 2, among resource element groups formed of resource elements having an identical index among resource elements to which 16 numbers are repeatedly assigned as indices on a frequency first basis, in each resource block pair, wherein the resource element groups include enhanced resource element group, resource element groups forming a control channel element in the localized downlink control channel set are located in a single resource block pair, and resource element groups forming a control channel element in the distributed downlink control channel set are located in two or more resource block pairs; and transmitting, to the UE, control information through at least one of the control channel elements.

The present disclosure provides a method for a User Equipment (UE) to receive control information from a transmission/reception point through a data area of resource block pairs (Physical Resource Block pairs) of a subframe, the method including: receiving a wireless signal through at least one of control channel elements that are allocated to 4 resource element groups having different indices and having an identical remainder obtained after dividing a corresponding resource element group index by 4 or allocated to 8 resource element groups having different indices and having an identical remainder obtained after dividing a corresponding resource element group index by 2, among resource element groups formed of resource elements having an identical index among resource elements to which 16 numbers are repeatedly assigned as indices on a frequency first basis, in each resource block pair wherein the resource element groups include enhanced resource element groups, a localized downlink control channel includes an enhanced physical downlink control channel, at least one localized downlink control channel set is configured with respect to a few of the resource block pairs, at least one distributed downlink control channel set is configured with respect to another few of the resource block pairs, resource element groups forming a control channel element in the localized downlink control channel set are located in a single resource block pair, and resource element groups forming a control channel element in the distributed downlink control channel set are located in two or more resource block pairs; and obtaining the control information from the wireless signal.

The present disclosure provides a transmission/reception point that transmits control information to a User Equipment (UE) through a data area of resource block pairs of a subframe where the resource block pairs include physical resource block pairs. The transmission/reception point may include a controller and a transmitter. The controller may be configured to configure at least one localized downlink control channel set with respect to a few of the resource block pairs where a localized downlink control channel includes an enhanced physical downlink control channel, to configure at least one distributed downlink control channel set with respect to another few of the resource block pairs, and to allocate control channel elements to 4 resource element groups having different indices and having an identical remainder obtained after dividing a corresponding resource element group index by 4 or to 8 resource element groups having different indices and having an identical remainder obtained after dividing a corresponding resource element group index by 2, among resource element groups formed of resource elements having an identical index among resource elements to which 16 numbers are repeatedly assigned as indices on a frequency first basis, in each resource block pair wherein the resource element groups include enhanced resource element group, resource element groups forming a control channel element in the localized downlink control channel set are located in a single resource block pair, and resource element groups forming a control channel element in the distributed downlink control channel set are located in two or more resource block pairs. The transmitter may be configured to transmit control information to a UE through at least one of the control channel elements.

The present disclosure provides a User Equipment (UE) that receives control information from a transmission/reception point through a data area of resource block pairs (Physical Resource Block pairs) of a subframe. The UE may include a receiver and a controller. The receiver may be configured to receive a wireless signal through at least one of control channel elements that are allocated to 4 resource element groups having different indices and having an identical remainder obtained after dividing a corresponding resource element group index by 4 or that are allocated to 8 resource element groups having different indices and having an identical remainder obtained after dividing a corresponding resource element group index by 2, among resource element groups formed of resource elements having an identical index among resource elements to which 16 numbers are repeatedly assigned as indices on a frequency first basis, in each resource block pair wherein the resource element groups include enhanced resource element groups, a localized downlink control channel includes an enhanced physical downlink control channel, at least one localized downlink control channel set is configured with respect to a few of the resource block pairs, at least one distributed downlink control channel set is configured for another few of the resource block pairs, resource element groups forming a control channel element in the localized downlink control channel set are located in a single resource block pair, and resource element groups forming a control channel element in the distributed downlink control channel set are located in two or more resource block pairs. The controller may be configured to obtain the control information from the wireless signal.

MODE FOR CARRYING OUT THE INVENTION

Figure 1:
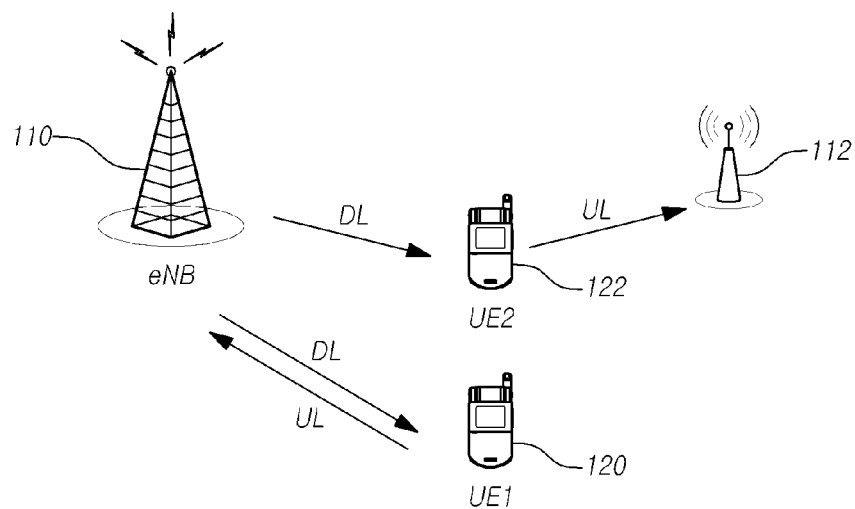
FIG. 1 illustrates an example of a wireless communication system according to embodiments.

Hereinafter, embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, packet data, and the like. The wireless communication system may include a User Equipment (UE) and a Transmission/Reception point (TP/RP). Throughout the specifications, the user equipment may be an inclusive concept indicating a user terminal utilized in wireless communication, including a User Equipment (UE) in WCDMA, LTE, HSPA, and the like, and an Mobile station (MS), a User Terminal (UT), an Subscriber Station (SS), a wireless device, and the like in Global System for Mobile communications (GSM).

A T/R point may generally refer to a station where communication with a UE is performed, and may also be referred to as a Base Station (BS) or a cell, a Node-B, an evolved Node-B (eNB), a Sector, a Site, a Base Transceiver System (BTS), an Access Point, a Relay Node, an Remote Radio Head (RRH), an Radio Unit (RU), and the like.

That is, the base station 20 or the cell may be construed as an inclusive concept indicating a portion of an area covered by a Base station Controller (BSC) in code division multiple access (CDMA), a NodeB in wideband CDMA (WCDMA), an eNB or a sector (site) in LTE, and the like, and the concept may include various coverage areas, such as a megacell, a macrocell, a microcell, a picocell, a femtocell, a communication range of a relay node, and the like.

In the specifications, the user equipment and the base station are used as two inclusive transceiving subjects to embody the technology and technical concepts described in the specifications, and may not be limited to a predetermined term or word. The UE and the T/R point are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), and the like, and may be configured as a data channel, such as a Physical Downlink Shared Channel (PDSCH), a Physical Uplink Shared Channel (PUSCH), and the like, so as to transmit data.

In the present specification, a cell may refer to the coverage of a signal transmitted from a Transmission/Reception (T/R) point, a component carrier having the coverage of the signal transmitted from the T/R point (e.g., transmission point or transmission/reception point), or the T/R point itself. FIG. 1 illustrates an example of a wireless communication system according to embodiments. In the specifications, the T/R point refers to a transmission point that transmits a signal, a reception point that receives a signal, or a combination thereof (transmission/reception point).

FIG. 1 illustrates an example of a wireless communication system according to embodiments.

Referring to FIG. 1, a wireless communication system 100 according to embodiments refers to a Coordinated Multi-point transmission/reception (CoMP) system where two or more transmission/reception points cooperatively transmit a signal, a coordinated multi-antenna transmission system, or a coordinated multi-cell communication system. The CoMP system 100 may include at least two transmission/reception points 110 and 112, and UEs 120 and 122.

A transmission/reception point may be a base station or a macro cell (hereinafter, referred to as an 'eNB' 110) and at least one RRH 112 that is connected to the eNB 110 through an optical cable or an optical fiber and is wiredly controlled, and has a high transmission power or a low transmission power within a macro cell area. The eNB 110 and the RRH 112 may have an identical cell ID, or may have different cell IDs.

Hereinafter, a downlink refers to communication or a communication path from the transmission/reception point 110 and 112 to the UE 120, and an uplink refers to communication or a communication path from the UE 120 to the transmission/reception point 110 and 112. In the downlink, a transmitter may be a part of the T/R point 110 and 112, and a receiver may be a part of the UE 120 and 122. In the uplink, a transmitter may be a part of the UE 120, and a receiver may be a part of the transmission/reception point 110 and 112.

Hereinafter, signal transmission or signal reception through a channel such as a Physical Uplink Control Channel (PUCCH), a Physical Uplink Shared Channel (PUSCH), a Physical Downlink Control Channel (PDCCH), a Physical Downlink Shared Channel (PDSCH), or the like, may be described through the expression "a PUCCH, a PUSCH, a PDCCH, or a PDSCH is transmitted or received."

An eNB executes downlink transmission to UEs. The eNB may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In wireless communication, one radio frame is formed of 10 subframes and one subframe is formed of two slots. The radio frame has a length of 10 ms and one subframe may have a length of 1.0 ms. In general, the basic unit for data transmission is a subframe and downlink or uplink scheduling is performed based on a subframe unit. In a time domain, a single slot includes Orthogonal Frequency Division Modulation (OFDM) symbols for a normal Cyclic Prefix (CP) or 6 OFDM symbols for an extended Cyclic Prefixes (CP).

A frequency domain in the wireless communication may be formed based on, for example, a subcarrier unit of 15 KHz.

In a downlink, time-frequency resources may be configured based on a Resource Block (RB) unit. A resource block may be formed of a single slot in the time domain, and 180 kHz (12 subcarriers) in the frequency domain. A resource formed of a single subcarrier (2 slots) in the time domain and 12 subcarriers in the frequency domain may be referred to as a Resource Block Pair (RBP). The total number of resource blocks may vary based on a system bandwidth.

A Resource Element (RE) may be formed of a single OFDM symbol in the time axis, and a single subcarrier in the frequency axis. A single resource block pair may include 14×12 resource elements (normal CP) or 12×12 resource elements (extended CP).

Figure 2:
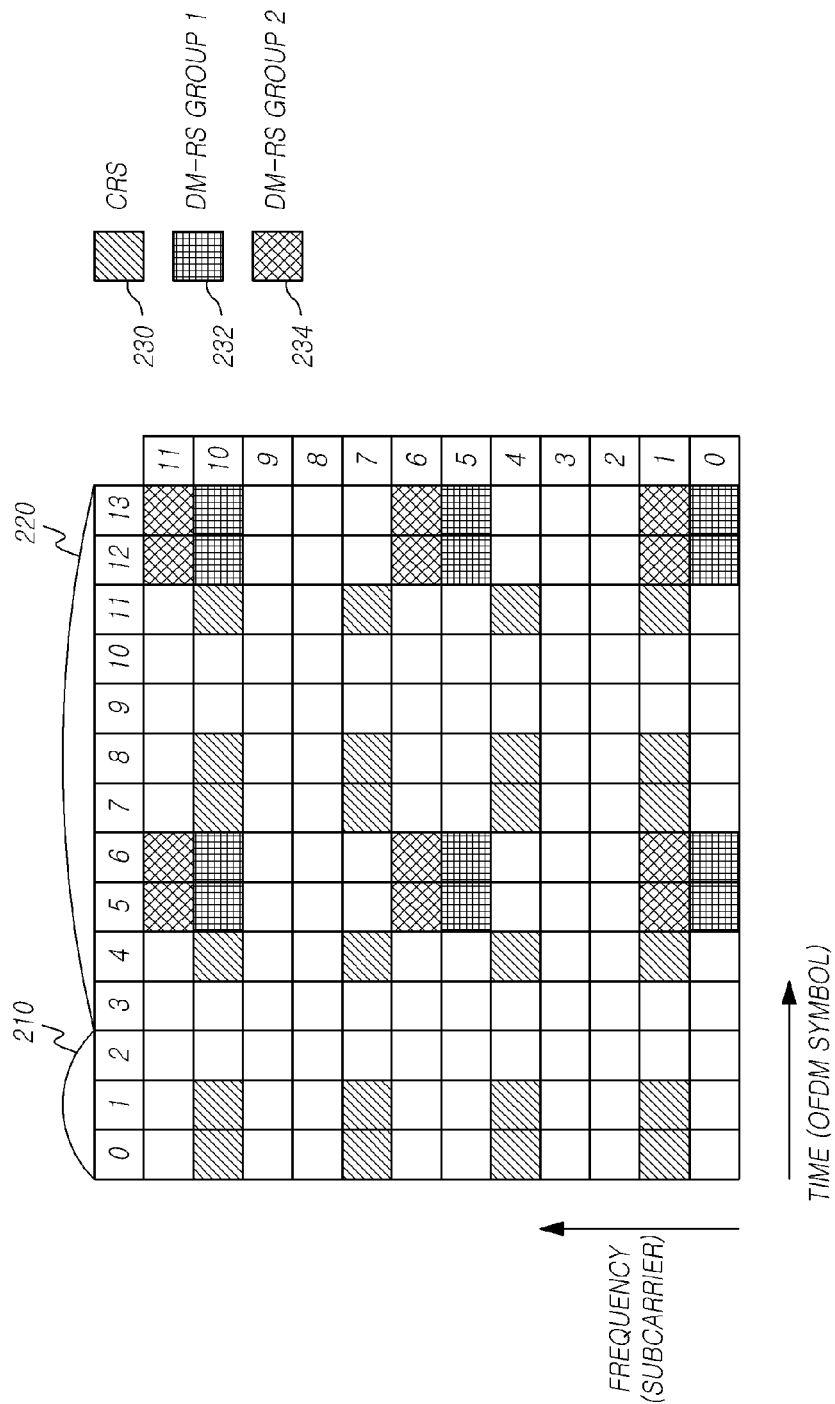
FIG. 2 illustrates a single resource block pair in a case of a normal cyclic prefix (CP) as an example of a structure of a downlink resource in an Long Term Evolution (LTE) or LTE-Advanced (LTE-A) system.

FIG. 2 illustrates a single resource block pair in a case of a normal cyclic prefix (CP) as an example of a structure of a downlink resource in an Long Term Evolution (LTE) or LTE-Advanced (LTE-A) system.

Referring to FIG. 2, a single resource block pair is formed of 14 OFDM symbols (l=0~13) and 12 subcarriers (k=0~11), in the case of a normal CP. In the example of FIG. 2, an area (l=0~2) formed of the front three OFDM symbols of the 14 OFDM symbols that belongs to a single resource block pair may be a control area 210 that is allocated for a control channel such as a Physical Control Format Information Channel (PCFICH), a Physical Hybrid ARQ Indicator Channel (PHICH), a Physical Downlink Control Channel (PDCCH), and the like. The remaining area (l=3~13) may be a data area 220 that is allocated for a data channel such as a Physical Downlink Shared Channel (PDSCH). Although FIG. 2 illustrates that 3 OFDM symbols are allocated for the control area 210, it is possible that 1 to 4 OFDM symbols may be allocated for the control area 210. Size information of an OFDM symbol of the control area 210 may be transferred through a PCFICH. A PDCCH may be transmitted through the entire system band, and a PDSCH may be transmitted based on a resource block. A UE determines a PDCCH that is configured for the UE, and when data corresponding to the UE does not exist, the UE enters into a micro sleep mode so as to reduce power consumption of the UE in the data area 120.

Referring to FIG. 2, a reference signal may be mapped to a predetermined resource element of a downlink. That is, in the downlink, a common Reference Signal or a Cell-specific Reference Signal (CRS) 230, a DeModulation Reference Signal (DM-RS) 232 or a UE-specific Reference Signal 234, a Channel Status Information Reference Signal (CSI-RS), and the like may be transmitted. For ease of description, FIG. 2 illustrates only the CRS 230 and the DM-RS 232 and 234.

The CRS 230 located in the control area 210 may be used for channel estimation for decoding a PDCCH, and the CRS 230 located in the data area 220 may be used for downlink channel estimation. The channel estimation for decoding data in the data area 220 may be executed using the DM-RS groups 232 and 234. The DM-RS groups 232 and 234 are multiplexed as a reference signal for a plurality of layers, using an orthogonal code. For example, in the case of a 4-layer transmission, by applying an orthogonal code having a length of 2 to two reference signal resource elements which are consecutive in the time axis, two different reference signals may be multiplexed for each reference signal group. In the case of an 8-layer transmission, by applying an orthogonal signal having a length of 4 to 4 reference signal elements distributed in the time axis, 4 different reference signals may be multiplexed for each reference signal group.

In the case of 1 or 2-layer transmission, a reference signal of each layer may be transmitted only using the DM-RS group 1 232. Thus, another DM-RS group 2 234 may be used for data transmission. A DM-RS corresponding to each layer is transmitted by applying a pre-coding applied to a corresponding layer. This may enable a receiving end (e.g., UE) to decode data without information associated with pre-coding applied in a transmitting end (e.g., eNB).

A control channel is required for the effective use of limited resources in the wireless communication system. However, a resource of the control area 210 may be an overhead of a system and may reduce a resource of the data area 220 used for data transmission. In an OFDM-based LTE system, a single resource block pair is formed of 14 or 12 OFDM symbols, and a maximum of 3 OFDM symbols may be used for the control area 210 and the remaining OFDM symbols may be used for the data area 220. In an LTE-A system that enables data transmission to a large number of users, a limited amount of resources in the control area 210 typically limits an increase in system capacity. Therefore, an increase in resources of a control channel is needed. Thus a control channel transceiving method of multiple users using a space division multiplexing scheme in the data area 220 may be considered. This method is to transmit and receive a control channel in the data area 220. For example, a control channel transmitted in the data area 220 may be referred to as an Extended PDCCH or Enhanced PDCCH (EPDCCH), but this may not be limited thereto.

In the existing 3GPP LTE/LTE-A rel-8/9/10 system, all UEs are dependent upon a Physical Downlink Control Channel (PDCCH) which is transmitted through the front 1~3 OFDM symbols (system bandwidth>10 PRBs) or the 2~4 OFDM symbols (system bandwidth≤10 PRBs) of a downlink subframe, for receiving a downlink DCI. A basic unit of PDCCH transmission for a UE is a Control Channel Element (CCE), and a single CCE is formed of 9 Resource Element Groups (REGs). A single REG is formed by grouping 4 consecutive Resource Element (RES) in the frequency axis, excluding REs through which other physical channels, such as, a PCFICH and a PHICH, existing in a PDCCH area of a corresponding downlink subframe, and a physical signal, such as, Cell-specific Reference Signal (CRS), are transmitted.

For EPDCCH transmission resource mapping for a UE, Enhanced REG (EREG)/Enhanced CCE (ECCE) may be used for an EPDCCH, like the typical concept of an REG and a CCE of a PDCCH.

In the case of a newly introduced EPDCCH in 3GPP LTE/LTE-A release 11 and systems that followed therefrom, unlike the legacy PDCCH, transmission is executed through a downlink subframe or a PDSCH area of a Downlink Pilot Time Slot (DwPTS) of a special subframe. For a UE that is set to receive Downlink Control Information (DCI) through a corresponding EPDCCH, it is defined that a maximum of K EPDCCH sets formed of a group of M Physical Resource Block (PRBs) is allocated in a corresponding cell. The largest value of K is one of 2, 3, 4, and 6, and M is a natural number greater than or equal to 1 and less than or equal to the number of PRBs. In addition, EPDCCH sets, configured for a UE, may have different M values.

In addition, an EPDCCH type corresponding one of a distributed type and a localized type may be set for each EPDCCH set, and may be signaled.

The EPDCCH set may be a localized type or a distributed type, based on an EPDCCH transmission type. M may be 1 or $2^n$ (n=1, 2, 3, 4, 5) in the case of the localized type, but this may not be limited thereto. In the case of the distributed type, M may be 2, 4, 8, and 16, but this may not be limited thereto.

Figure 3:
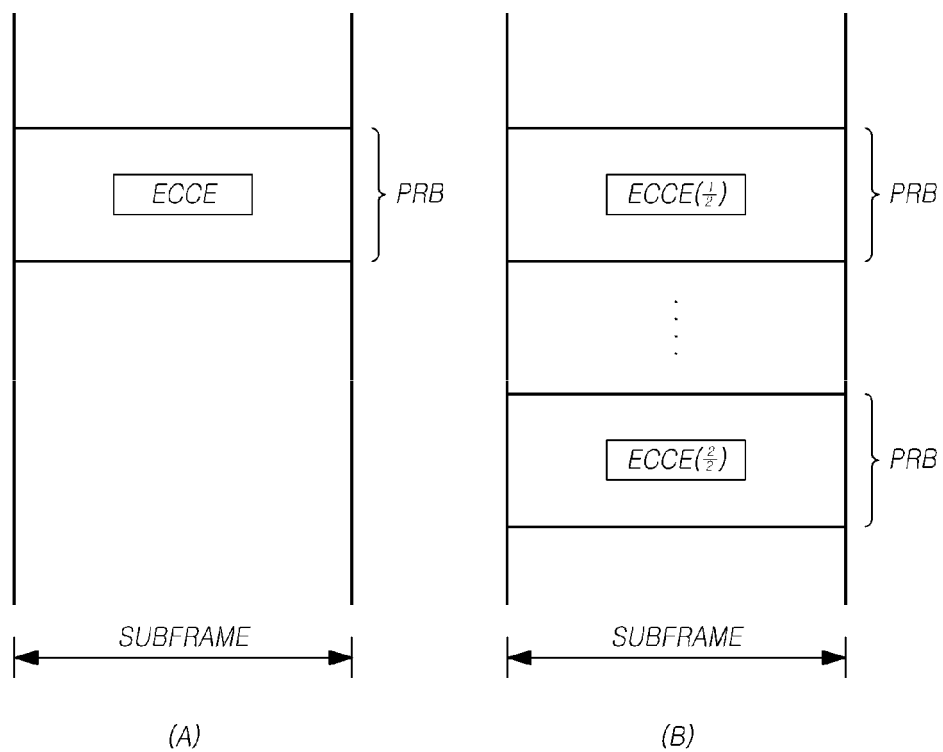
FIG. 3 illustrates two types of EPDCCH transmissions (e.g. a localized EPDCCH transmission and a distributed EPDCCH transmission)

FIG. 3 illustrates two types of EPDCCH transmissions including a localized EPDCCH transmission and a distributed EPDCCH transmission.

The number of downlink Physical Resource Blocks (PRBs) forming a system band supported by a cell formed by a communication common carrier is referred to as $N_{PRB}$. In this instance, an EPDCCH transmitted through a corresponding PDSCH area may be roughly classified into a localized EPDCCH transmission and a distributed EPDCCH transmission, as shown in (a) and (b) of FIG. 3. Accordingly, an ECCE structure and the number of REs forming a single ECCE may change based on an EPDCCH transmission type, or may be identical irrespective of an EPDCCH transmission type.

The localized EPDCCH transmission is shown in a diagram (A) of FIG. 3. Such a diagram (A) of FIG. 3 indicates that a single ECCE is located in a single resource block pair and is transmitted. The distributed EPDCCH transmission is shown in a diagram (B) of FIG. 3. Such a diagram (B) of FIG. 3 indicates that a single ECCE is distributed in at least two resource block pairs and is transmitted.

K EPDCCH sets may be allocated for a single UE where K is a natural number greater than or equal to 2. Each EPDCCH set may correspond to a distributed type or a localized type. KL localized EPDCCHs and KD distributed EPDCCHs may be allocated for a single UE. KL is a natural number greater than or equal to 1, and KD is a natural number greater than or equal to 1. That is, KL+KD=K.

According to a newly introduced EREG/ECCE, for a single PRB pair forming each EPDCCH set, a total of 16 EREGs, that is, EREG #0~EREG #15, may be configured in a corresponding PRB pair, irrespective of a frame structure type, a subframe configuration, the length of a Cyclic Prefix (CP), a legacy PDCCH control area size, the existence of a reference signal (for example, a CRS, a CSI-RS, a PRS, and the like) excluding a DM-RS, and the like.

Particularly, for a single PRB pair forming an EPDCCH set, in the case of a normal CP, EREG indexing may be executed with respect to 144 REs remaining after excluding 24 REs for a DM-RS from a total of 12×14=168 REs, using 16 numbers from 0 to 15, based on a frequency first and then time manner. In the same manner, for the case of an extended CP, EREG indexing may be executed with respect to 128 REs remaining after excluding 16 REs for a DM-RS from a total of 12×12=144 REs, using 16 numbers from 0 to 15, based on a frequency first and then time manner.

The example of EREG indexing in a single PRB pair forming an EPDCCH set in a downlink subframe corresponding to the normal CP (e.g., normal DL subframe), is illustrated in FIG. 4 to FIG. 9. However, in FIG. 4 to FIG. 9, the parts that are filled with an oblique pattern and do not include a number indicate REs used for a DM-RS, and the parts that are filled with a lattice pattern or an oblique pattern and include a number indicate REs through which a CRS is transmitted.

Figure 4:
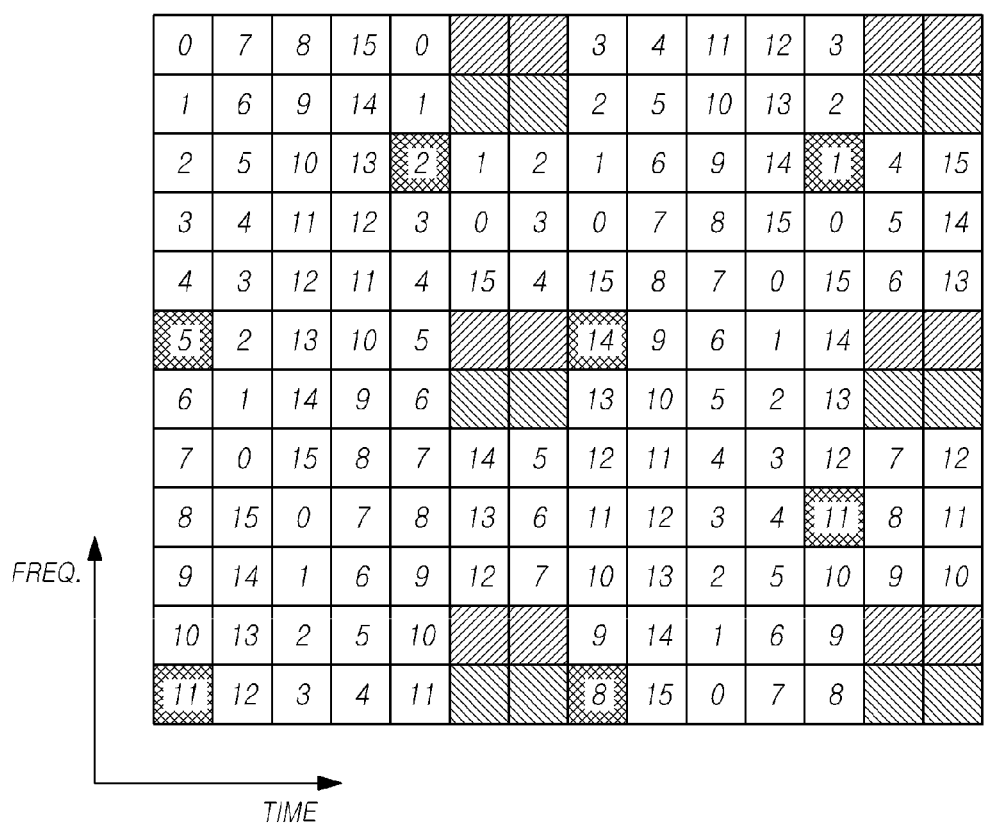
FIG. 4 is a diagram illustrating an example of Resource Element (RE) mapping of a Physical Resource Block (PRB) pair to which EREG indexing is executed using a symbol-based Cyclic Shift, for a single transmission antenna port Cell-specific Reference Signal (CRS) port 0)

FIG. 4 is a diagram illustrating an example of RE mapping of a PRB pair to which EREG indexing is executed using a symbol-based Cyclic Shift (CS), for a single transmission antenna port (CRS port 0).

Referring to FIG. 4, EREGs are indexed with numbers from 0 to 15 based on a frequency first scheme, and the indexing is executed using the symbol-based cyclic shift. Therefore, the index of a second symbol, that is, 12 is indexed to be close to the index of a first symbol, that is, 11. In the same manner, the index of a third symbol, that is, 8 is indexed to be close to the index of a second symbol, that is, 7.

The PRB pair of FIG. 4 is associated with CRS port 0, and a CRS is mapped to 8 REs as shown in FIG. 3. A CRS may be mapped to a different location due to frequency shifts.

Figure 5:
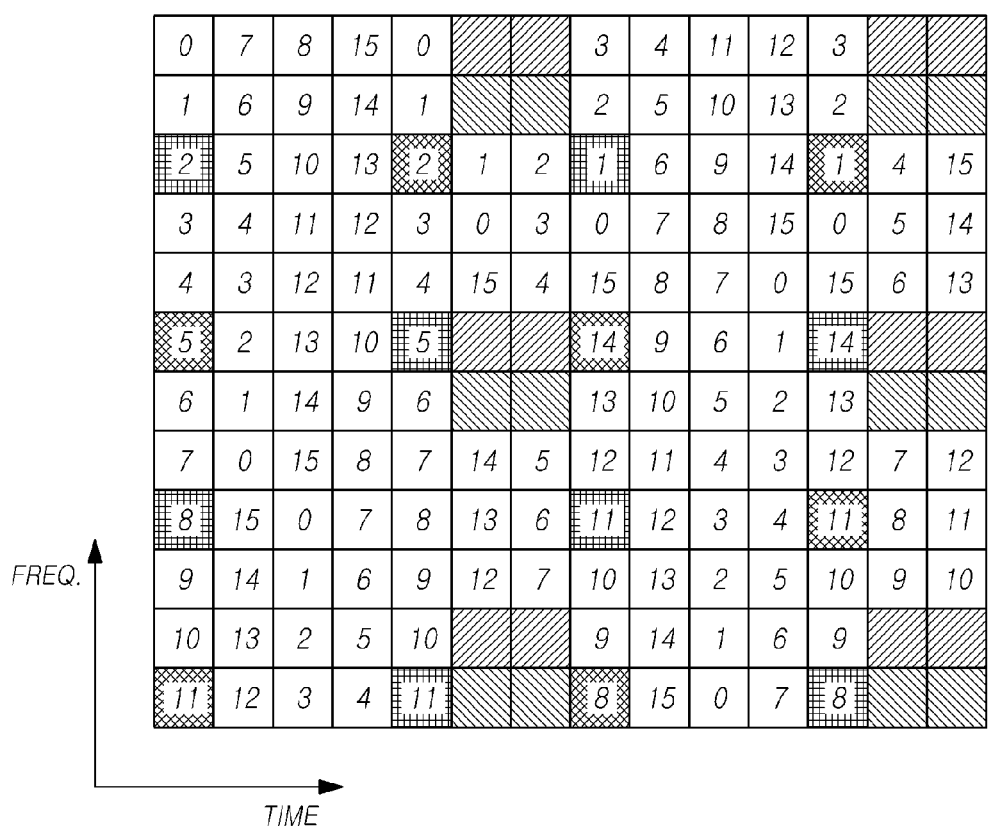
FIG. 5 is a diagram illustrating an example of RE mapping of a PRB pair to which EREG indexing is executed using a symbol-based cyclic shift, for two transmission antenna ports (CRS ports 0 and 1)
Figure 6:
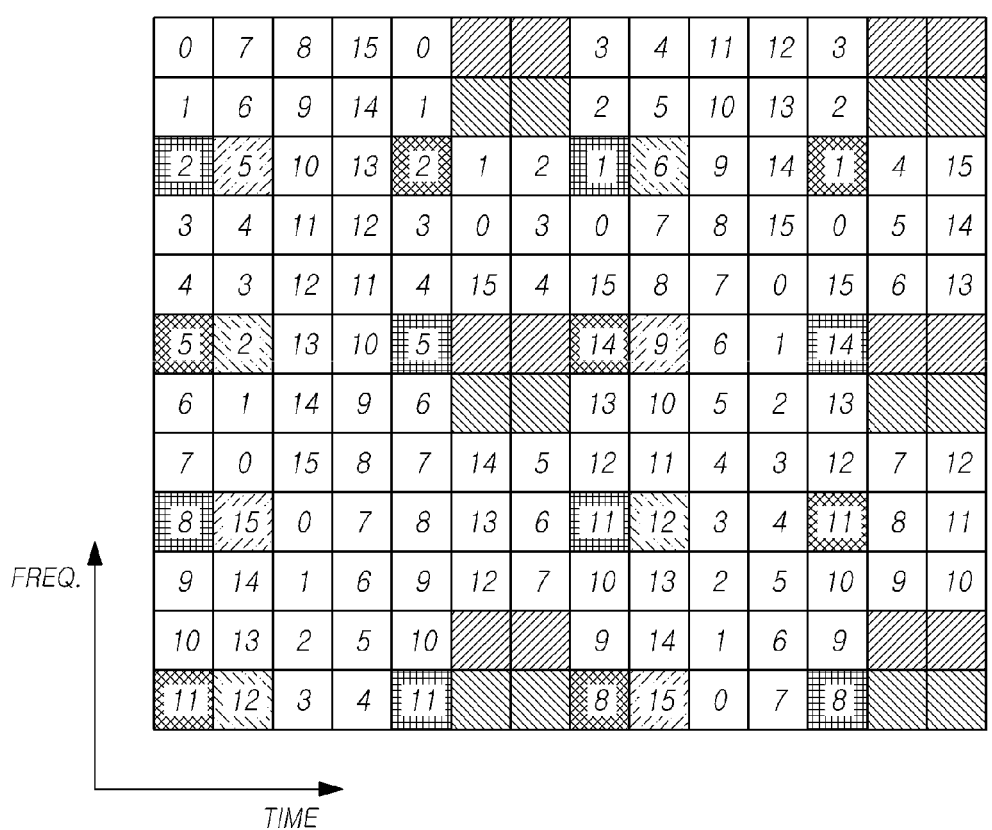
FIG. 6 is a diagram illustrating an example of RE mapping of a PRB pair to which EREG indexing is executed using a symbol-based cyclic shift, for four transmission antenna ports (CRS ports 0, 1, 2, and 3)

FIG. 5 is a diagram illustrating an example of RE mapping of a PRB pair to which EREG indexing is executed using a symbol-based CS, for two transmission antenna ports (e.g., CRS ports 0 and 1), and FIG. 6 is a diagram illustrating an example of RE mapping of a PRB pair to which EREG indexing is executed using a symbol-based CS, for four transmission antenna ports (e.g., CRS ports 0, 1, 2, and 3).

The REs of FIG. 5 and FIG. 6 may be indexed using a symbol-based CS, in the same manner as FIG. 4. In FIG. 5, a CRS is mapped to another 8 REs in addition to the REs for the CRS of FIG. 4, for the CRS ports 0 and 1. In FIG. 6, a CRS is mapped to another 8 REs in addition to the REs for the CRSs of FIG. 5, for the CRS ports 0, 1, 2, and 3.

The above described examples of FIG. 4 to FIG. 6 correspond to an example in which a cyclic shift is applied when EREG indexing is executed for each OFDM symbol. Hereinafter, examples in which a cyclic shift is not applied will be described through FIG. 7 to FIG. 9.

Figure 7:
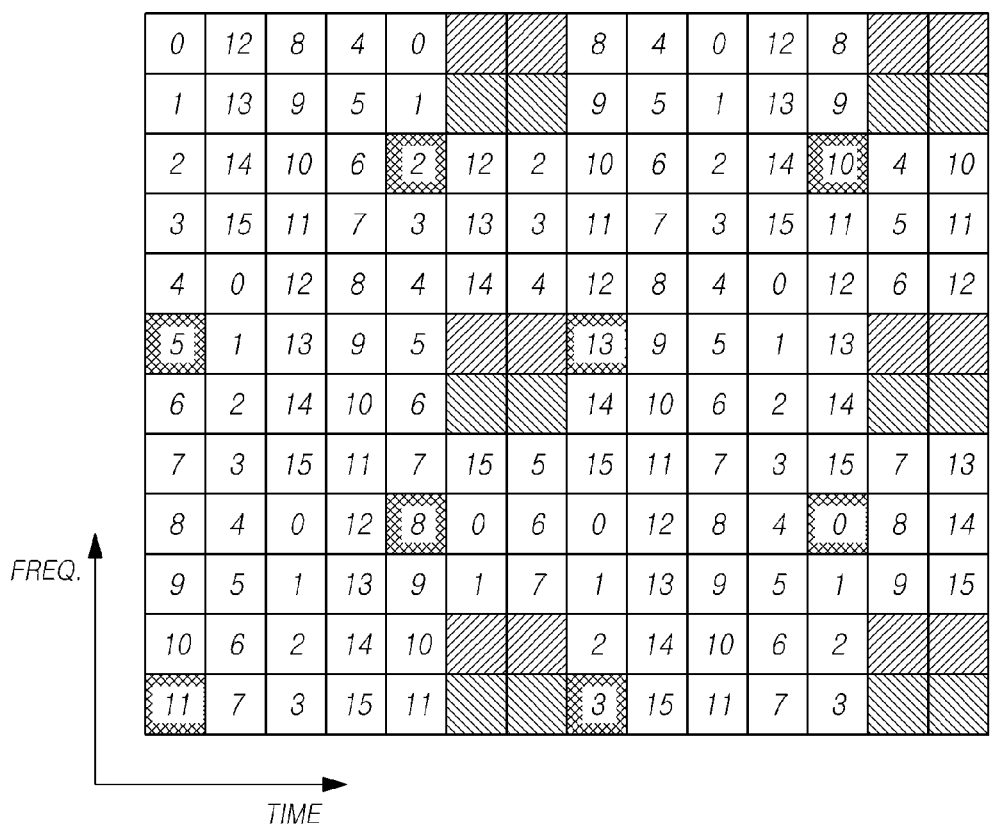
FIG. 7 is a diagram illustrating an example of RE mapping of a PRB pair to which EREG indexing is executed without a cyclic shift, for a single transmission antenna port (CRS port 0)
Figure 8:
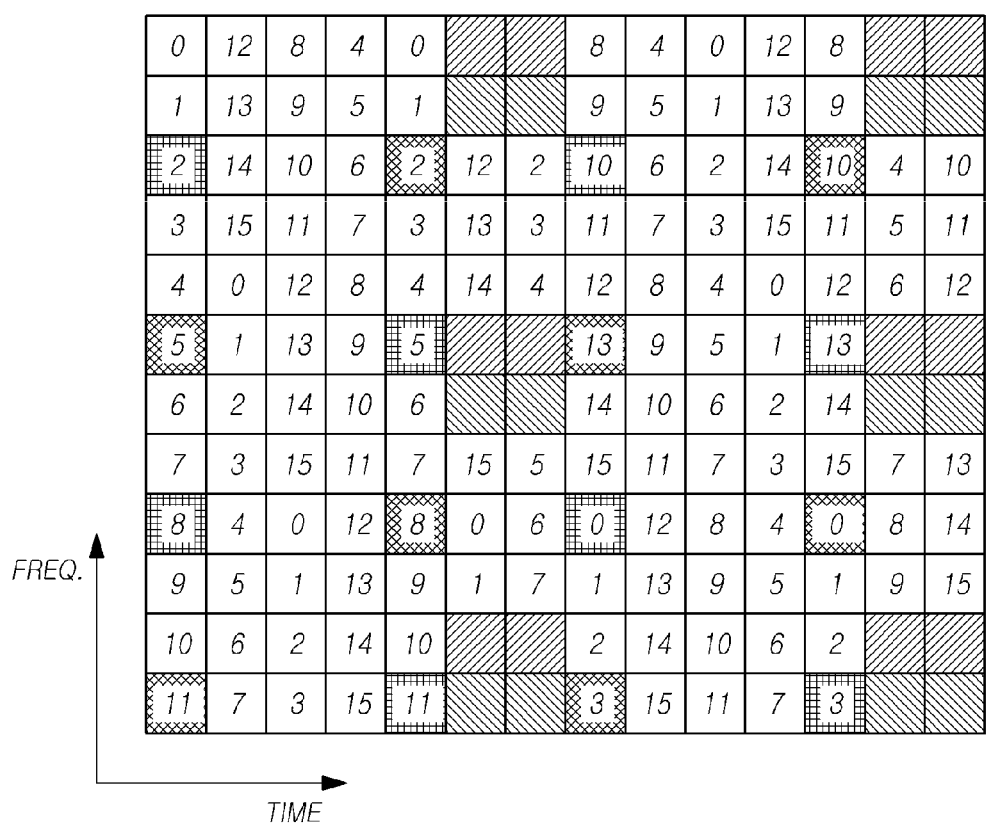
FIG. 8 is a diagram illustrating an example of RE mapping of a PRB pair to which EREG indexing is executed without a cyclic shift, for two transmission antenna ports (CRS ports 0 and 1)
Figure 9:
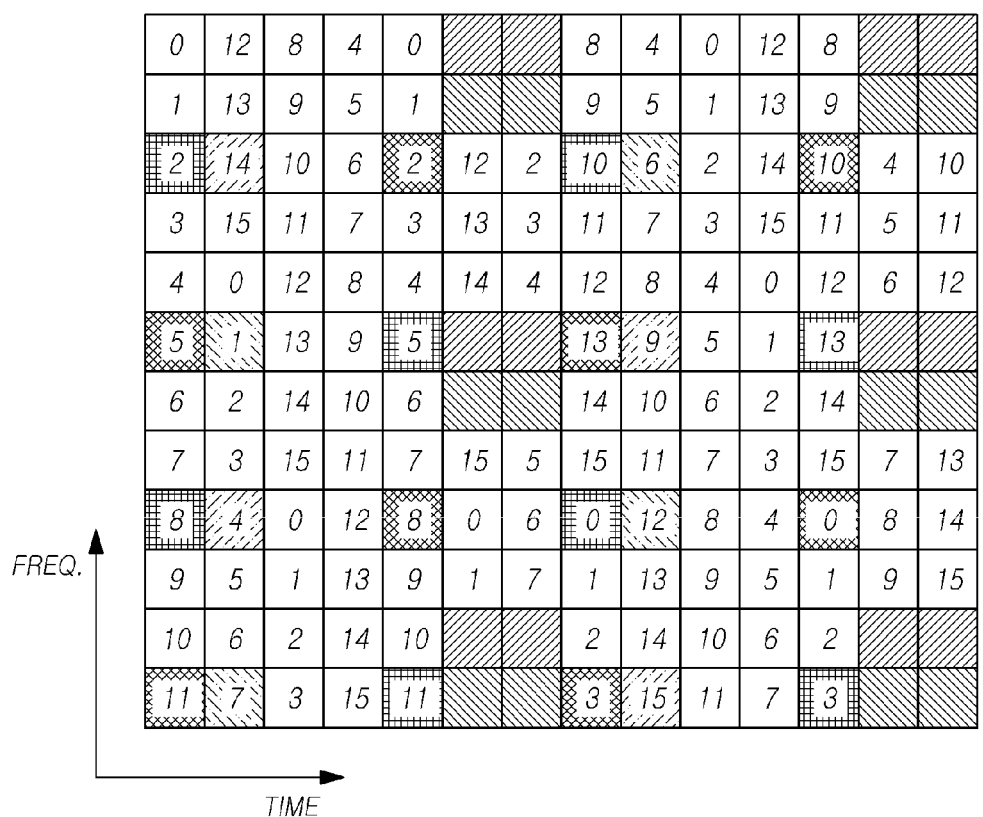
FIG. 9 is a diagram illustrating an example of RE mapping of a PRB pair to which EREG indexing is executed without a cyclic shift, for a four transmission antenna ports (CRS ports 0, 1, 2, and 3)

FIG. 7 is a diagram illustrating an example of RE mapping of a PRB pair to which EREG indexing is executed without a cyclic shift, for a single transmission antenna port (e.g., CRS port 0). FIG. 8 is a diagram illustrating an example of RE mapping of a PRB pair to which EREG indexing is executed without a cyclic shift, for two transmission antenna ports (e.g., CRS ports 0 and 1). FIG. 9 is a diagram illustrating an example of RE mapping of a PRB pair to which EREG indexing is executed without a cyclic shift, for a four transmission antenna ports (e.g., CRS ports 0, 1, 2, and 3).

In FIG. 7 to FIG. 9, CRS mapping is executed in the same manner as CRS mapping of FIG. 4 to FIG. 6. However, the indexing scheme is different.

Referring to FIG. 7, EREGs are indexed with numbers from 0 to 15 based on a frequency first scheme, and the indexing is executed without a cyclic shift. Therefore, the index of a second symbol, that is, 12 is indexed to be distant from the index of a first symbol, that is, 11. In the same manner, the index of a third symbol, that is, 8 is indexed to not be close to the index of a second symbol, that is, 7.

In FIG. 4 to FIG. 9, REs having an identical index are grouped into a single EREG. Therefore, a total of 16 EREGs from EREG #0 to EREG #15 may be allocated to a single PRB pair. Although FIG. 4 to FIG. 9 are associated with the PRB pair of the normal CP, a total of 16 EREGs from EREG #0 to EREG #15 may be allocated to a PRB pair of an extended CP based on the same manner.

Referring to FIG. 4 to FIG. 9, each of EREG #0, EREG #1, . . . , and EREG #15 configured in a single PRB pair may be formed of 9 REs. However, the number of REs that may be actually used for EPDCCH transmission for each EREG may change based on the number of transmission antenna ports (e.g., the CRS port number) and the legacy PDCCH size, as illustrated in the drawings.

Referring again to FIG. 4, the total number of REs corresponding to index #0 is 9. However, when an area up to a third is configured as a control area, an EPDCCH is not transmitted through the REs of the corresponding area, and thus EREG #0 may be formed of 6 available REs excluding the corresponding REs. In the case of an EREG corresponding to index #1 has a total of 9 REs indexed with #1. However, after excluding a control area up to a third RE and an RE to which a CRS (please see top right side of FIG. 4) is mapped, EREG #1 may be formed of 5 available REs.

An ECCE which is a basic unit of EPDCCH transmission may be formed of N EREGs, based on a subframe type and a CP length. Particularly, N may be determined as follows.

First, for a normal subframe corresponding to the normal CP and subframes 3, 4, and 8 of special subframes corresponding to the normal CP, it is defined that N=4. That is, in this instance, 16 EREGs forming a single PRB pair may form a total of 4 ECCEs, each ECCE being formed of 4 EREGs.

As another example, for a normal subframe corresponding to the extended CP, subframes 1, 2, 6, 7, and 9 of the special subframes corresponding to the normal CP and subframes 1, 2, 3, 5, and 6 of the special subframes corresponding to the extended CP, it is defined that N=8. That is, in this instance, 16 EREGs forming a single PRB pair may form a total of 2 ECCEs, each ECCE being formed of 8 EREGs.

According to the legacy PDCCH, in the case of a downlink subframe (e.g., normal DL subframe), transmission is executed through the front 1 to 3 OFDM symbols or 2 to 4 OFDM symbols, and a single CCE is formed of 9 REGs. Therefore, a PDCCH CCE may be formed of 9×4=36 REs.

However, in the case of an EPDCCH, EREG indexing is executed based on RE without taking into consideration the legacy PDCCH size and REs used for another reference signal such as a CSI-RS, a CRS, and the like, and thus, the number of REs that are actually used for EPDCCH transmission vary based on the legacy control area size and the existence of other reference signals in a downlink subframe. That is, the number of REs used for EPDCCH transmission may be different for each EREG. Therefore, in the case of an ECCE which is a basic unit of the EPDCCH transmission, the number of actually available REs for each ECCE may be imbalanced.

Referring to FIG. 4 to FIG. 9, each of EREG #0, EREG #1, . . . , and EREG #15 configured in a single PRB pair may be formed of 9 REs. However, the number of REs that are actually used for EPDCCH transmission for each EREG is determined based on the number of CRS ports and the legacy PDCCH size, as illustrated in FIG. 4 to FIG. 9. The following Tables 1 to 3 list the number of REs that are actually used for EPDCCH transmission for each EREG index, in a single PRB pair that forms an EPDCCH set, configured based on a legacy PDCH size in a normal downlink subframe and a CRS port setting, according to FIG. 4.

TABLE 1

|  | CRS port 0 | CRS port 0, 1 | CRS port 0, 1, 2, 3 |
| --- | --- | --- | --- |
| EREG #0 | 7 | 6 | 6 |
| EREG #1 | 8 | 8 | 7 |
| EREG #2 | 7 | 7 | 7 |
| EREG #3 | 7 | 6 | 6 |
| EREG #4 | 8 | 8 | 8 |
| EREG #5 | 8 | 7 | 7 |
| EREG #6 | 8 | 8 | 7 |
| EREG #7 | 8 | 8 | 7 |
| EREG #8 | 7 | 7 | 7 |
| EREG #9 | 8 | 8 | 8 |
| EREG #10 | 7 | 6 | 6 |
| EREG #11 | 8 | 7 | 7 |
| EREG #12 | 9 | 9 | 8 |
| EREG #13 | 8 | 7 | 7 |
| EREG #14 | 9 | 9 | 9 |
| EREG #15 | 9 | 9 | 9 |

Table 1 lists the number of available REs for each EREG based on a CRS port setting when the legacy PDCCH size is 1. In this instance, Table 1 is arranged based on EREG indexing without a cyclic shift.

TABLE 2

|  | CRS port 0 | CRS port 0, 1 | CRS port 0, 1, 2, 3 |
| --- | --- | --- | --- |
| EREG #0 | 6 | 5 | 5 |
| EREG #1 | 7 | 7 | 6 |
| EREG #2 | 6 | 6 | 6 |
| EREG #3 | 6 | 5 | 5 |
| EREG #4 | 7 | 7 | 7 |
| EREG #5 | 7 | 6 | 6 |
| EREG #6 | 7 | 7 | 6 |
| EREG #7 | 7 | 7 | 6 |
| EREG #8 | 7 | 7 | 7 |
| EREG #9 | 8 | 8 | 8 |
| EREG #10 | 7 | 6 | 6 |
| EREG #11 | 8 | 7 | 7 |
| EREG #12 | 8 | 8 | 7 |
| EREG #13 | 7 | 6 | 6 |
| EREG #14 | 8 | 8 | 8 |
| EREG #15 | 8 | 8 | 8 |

Table 2 lists the number of available REs for each EREG based on a CRS port setting when the legacy PDCCH size is 2. In this instance, Table 2 is arranged based on EREG indexing without a cyclic shift.

TABLE 3

|  | CRS port 0 | CRS port 0, 1 | CRS port 0, 1, 2, 3 |
| --- | --- | --- | --- |
| EREG #0 | 5 | 4 | 4 |
| EREG #1 | 6 | 6 | 5 |
| EREG #2 | 5 | 5 | 5 |
| EREG #3 | 5 | 4 | 4 |
| EREG #4 | 7 | 7 | 7 |
| EREG #5 | 7 | 6 | 6 |
| EREG #6 | 7 | 7 | 6 |
| EREG #7 | 7 | 7 | 6 |
| EREG #8 | 6 | 6 | 6 |
| EREG #9 | 7 | 7 | 7 |
| EREG #10 | 6 | 5 | 5 |
| EREG #11 | 7 | 6 | 6 |
| EREG #12 | 7 | 7 | 6 |
| EREG #13 | 6 | 5 | 5 |
| EREG #14 | 7 | 7 | 7 |
| EREG #15 | 7 | 7 | 7 |

Table 3 lists the number of available REs for each EREG based on a CRS port setting when the legacy PDCCH size is 3. In this instance, Table 3 is arranged based on EREG indexing without a cyclic shift.

Referring to Tables 1 to 3, the number of REs that may be actually used for EPDCCH transmission is different for each EREG. For the reason, the number of REs that may be used for each ECCE may be different based on a scheme of allocating an EREG to an ECCE.

The present disclosure considers the above described problems and provides a method of mapping an EREG that forms each ECCE. Particularly, the present disclosure provides an ECCE/EREG mapping method for a localized type EPDCCH set and distributed type EPDCCH set.

Particularly, the present disclosure provides a method of configuring each ECCE in M PRB pairs forming a localized type EPDCCH set and a distributed type EPDCCH set, as described in the present disclosure. Particularly, the present disclosure provides an optimal ECCE/EREG mapping method that takes into consideration the number of REs that may be used for EPDCCH transmission in a corresponding PRB pair, based on a legacy PDCCH and a CRS transmitted through all downlink subframes and a DwPTS area of a special subframe.

In addition, in the case of distributed EPDCCH transmission, EREGs forming a single ECCE may be configured to be distributed in M PRB pairs forming a corresponding EPDCCH set, so as to maximize a frequency diversity gain. The present disclosure provides an ECCE/EREG mapping method for the distributed type EPDCCH set, by taking into consideration the above described fact.

For ease of description, the present disclosure indicates M PRB pairs forming an EPDCCH set as an Enhanced Physical Resource Block (EPRB), which is distinguished from a PRB that is an existing PDSCH transmission unit. A corresponding EPRB index #m indicates an order of PRB indices of PRB pairs forming a corresponding EPDCCH set, and PRB pairs, from a PRB pair having the lowest PRB index to a PRB pair having the largest PRB index, are indexed with EPRB #0, . . . , and EPRB #(M−1), respectively.

[First Embodiment] Configuring an ECCE Using N Consecutive EREGs

The first embodiment provides a method of configuring a single ECCE using N consecutive EREGs, in a single PRB pair forming an EPDCCH set, and a method of indexing an ECCE.

In the example of Table 1 (legacy PDCCH size 1), when a single ECCE is configured by grouping 4 consecutive EREGs according to the first embodiment, the EREGs forming each ECCE and the number of available REs for each ECCE are listed as shown in Table 4.

TABLE 4

| ECCE | EREG | 1 Tx CRS | 2 Tx CRS | 4 Tx CRS |
|---|---|---|---|---|
| 1$^{st}$ ECCE | EREG #0~EREG#3 | 29 REs | 27 REs | 26 REs |
| 2$^{nd}$ ECCE | EREG #4~EREG#7 | 32 REs | 31 REs | 29 REs |
| 3$^{rd}$ ECCE | EREG #8~EREG#11 | 30 REs | 28 REs | 28 REs |
| 4$^{th}$ ECCE | EREG #12~EREG#15 | 35 REs | 34 REs | 33 REs |

For four transmission antenna ports (e.g., 4 Tx CRS), the number of available REs of 1st ECCE is 26 and the number of available REs of 4$^{th}$ ECCE is 33, which is different up to 7 REs. As described above, the number of available REs that form each ECCE may be highly imbalanced.

This is similar when the legacy PDCCH size is 2 (Table 5) or 3 (Table 6).

In the example of Table 2 (legacy PDCCH size 2), when a single ECCE is configured by grouping 4 consecutive EREGs, the EREGs forming each ECCE and the number of available REs for each ECCE may be listed as shown in Table 5.

TABLE 5

| ECCE | EREG | 1 Tx CRS | 2 Tx CRS | 4 Tx CRS |
|---|---|---|---|---|
| 1st ECCE | EREG #0~EREG#3 | 25 REs | 23 REs | 22 REs |
| 2nd ECCE | EREG #4~EREG#7 | 28 REs | 27 REs | 25 REs |
| 3rd ECCE | EREG #8~EREG#11 | 30 REs | 28 REs | 28 REs |
| 4th ECCE | EREG #12~EREG#15 | 31 REs | 30 REs | 29 REs |

For four transmission antenna ports (e.g., 4 Tx CRS), the number of available REs of 1st ECCE is 22 and the number of available REs of 4$^{th}$ ECCE is 29, which is different up to 7 REs.

In the example of Table 3 (legacy PDCCH size 3), when a single ECCE is configured by grouping 4 consecutive EREGs, the EREGs forming each ECCE and the number of available REs for each ECCE may be listed as shown in Table 6.

TABLE 6

| ECCE | EREG | 1 Tx CRS | 2 Tx CRS | 4 Tx CRS |
|---|---|---|---|---|
| 1$^{st}$ ECCE | EREG #0~EREG#3 | 21 REs | 19 REs | 18 REs |
| 2$^{nd}$ ECCE | EREG #4~EREG#7 | 28 REs | 27 REs | 25 REs |
| 3$^{rd}$ ECCE | EREG #8~EREG#11 | 26 REs | 24 REs | 24 REs |
| 4$^{th}$ ECCE | EREG #12~EREG#15 | 27 REs | 26 REs | 25 REs |

For four transmission antenna ports (e.g., 4 Tx CRS), the number of available REs of 1$^{st}$ ECCE is 18 and the number of available REs of 4$^{th}$ ECCE is 25, which is different up to 7 REs.

Accordingly, when a corresponding EPDCCH set is a localized type EPDCCH set, in the EPDCCH set formed of a group of M Physical Resource Blocks (PRBs) where M is 2, 4, 8, or 16, ECCEs forming the corresponding EPDCCH set may be configured according to the first embodiment, as follows.

Particularly, ECCEs configured according to the first embodiment may be indexed from the lowest PRB pair (e.g., a PRB pair having the lowest PRB index) among the M PRBs forming a localized type EPDCCH set, in ascending order.

Figure 10:
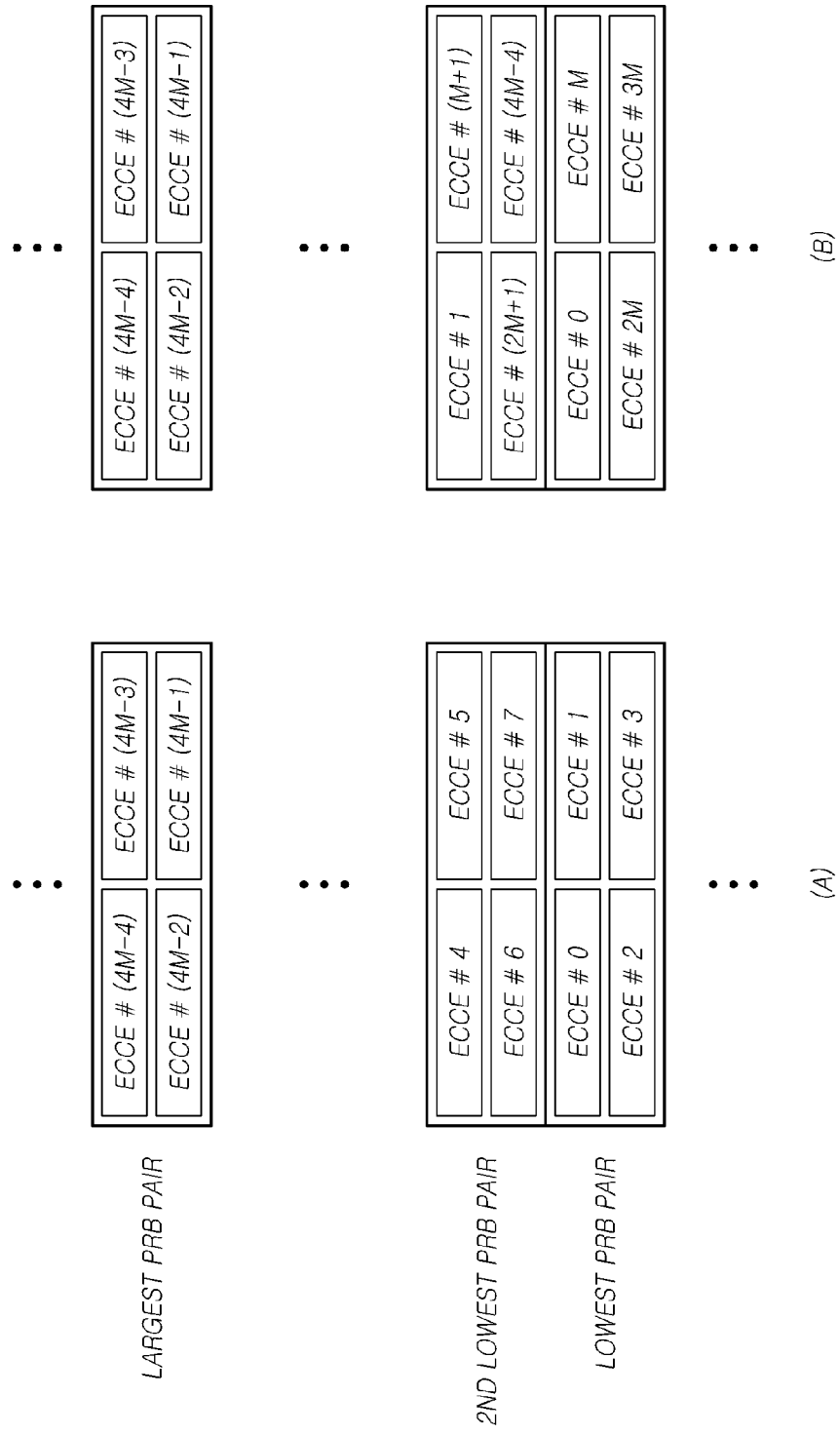
FIG. 10 is a diagram illustrating an example of EREG mapping of a localized type EPDCCH set according to first and second embodiments.

Referring to a diagram (A) of FIG. 10, in the lowest PRB pair, 1$^{st}$ ECCE formed of EREG #0~EREG #3 is indexed as ECCE #0, 2$^{nd}$ ECCE formed of EREG #4~EREG#7 is indexed as ECCE #1, 3$^{rd}$ ECCE formed of EREG #8~EREG#11 is indexed as ECCE #2, and 4$^{th}$ ECCE formed of EREG #12~EREG #15 is indexed as ECCE #3. Subsequently, in the same manner, in a PRB pair having the second lowest PRB index, 1$^{st}$, 2$^{nd}$, 3$^{rd}$, and 4$^{th}$ ECCEs respectively formed of EREG #0~3, EREG #4~7, EREG #8~11, and EREG #12~15 are indexed as ECCE #4, ECCE #5, ECCE #6, and ECCE #7, respectively. In this manner, 4 ECCEs configured in a PRB pair having the M$^{th}$ lowest PRB index are indexed as ECCE #(4M−4), ECCE #(4M−3), ECCE #(4M−2), and ECCE #(4M−1), respectively, and thus, ECCE indexing of the corresponding localized type EPDCCH set and mapping of EREGs forming each ECCE may be executed.

As another method, with respect to M PRBs forming a localized type EPDCCH set, ECCEs are sequentially indexed from 1$^{st}$ ECCEs formed of EREG #0, #1, #2, and #3 in corresponding PRB pairs.

Referring to a diagram (B) of FIG. 10, M ECCEs, from 1$^{st}$ ECCE formed of EREG #0~EREG #3 in the lowest PRB to an ECCE formed of EREG #0~EREG #3 in the M$^{th}$ lowest PRB (e.g., the largest PRB index), are indexed with ECCE #0 to ECCE #(M−1), respectively, based on an order of a PRB index including a corresponding ECCE. Subsequently, M 2$^{nd}$ ECCEs formed of EREG #4, #5, #6, #7 in corresponding PRB pairs are indexed with ECCE #M to ECCE #(2M−1), respectively, in ascending order from the lowest PRB pair to the largest PRB pair. 3$^{rd}$ ECCEs formed of EREG #8 to EREG #11 in corresponding PRB pairs are indexed with ECCE #2M to ECCE #(3M−1), respectively, in ascending order. 4$^{th}$ ECCEs formed of EREG #12 to EREG #15 in corresponding PRB pairs are indexed with ECCE #3M to ECCE #(4M−1), respectively, in the same manner.

[Second Embodiment] Configuring an ECCE Using EREGs Having an Identical Remainder Obtained after Dividing a Corresponding EREG Index by 4 (or 2)

As described above, when a single ECCE is configured by simply grouping 4 consecutive EREGs, the number of REs that are actually used for each ECCE may be highly imbalanced. A major reason that causes the corresponding imbalance is whether 12 consecutive REs corresponding to a single OFDM symbol are to be used is determined based on the legacy PDCCH size. That is, from among 16 EREGs, EREGs corresponding to 12 consecutive REs and 4 consecutive EREGs may have a difference.

To overcome the above, the second embodiment provides a method of configuring a single ECCE by grouping EREG indices having an identical remainder obtained after dividing a corresponding EREG index value by 4 according to modulo 4, in a single PRB pair forming an EPDCCH set.

Accordingly, each ECCE may be configured as shown below.

1$^{st}$ ECCE: EREG #n having (n mod 4)=0
2$^{nd}$ ECCE: EREG #n having (n mod 4)=1
3$^{rd}$ ECCE: EREG #n having (n mod 4)=2
4$^{th}$ ECCE: EREG #n having (n mod 4)=3

In this instance, n=0, 1, 2, . . . , and 15, and n is an EREG index illustrated in FIG. 3 to FIG. 8.

That is, a PRB pair of an EPDCCH set, $1^{st}$ ECCE is formed of EREG #0, EREG #4, EREG #8, and EREG #12, $2^{nd}$ ECCE is formed of EREG #1, EREG #5, EREG #9, and EREG #13, $3^{rd}$ ECCE is formed of EREG #2, EREG #6, EREG #10, and EREG #14, and $4^{th}$ ECCE is formed of EREG #3, EREG #7, EREG #11, and EREG #15. When an ECCE is formed as described above, the number of REs available for each ECCE, according to a legacy PDCCH service may be calculated as follows.

When the legacy PDCCH size is 1, EREGs forming each ECCE and the number of available REs for each ECCE may be listed as shown in Table 7.

TABLE 7

| ECCE | EREG | 1 Tx CRS | 2 Tx CRS | 4 Tx CRS |
|---|---|---|---|---|
| $1^{st}$ ECCE | EREG #0, EREG #4, EREG #8, and EREG #12 | 31 REs | 30 REs | 28 REs |
| $2^{nd}$ ECCE | EREG #1, EREG #5, EREG #9, and EREG #13 | 32 REs | 30 REs | 28 REs |
| $3^{rd}$ ECCE | EREG #2, EREG #6, EREG #10, and EREG #14 | 31 REs | 30 REs | 28 REs |
| $4^{th}$ ECCE | EREG #3, EREG #7, EREG #11, and EREG #15 | 32 REs | 30 REs | 28 REs |

When the legacy PDCCH size is 2, EREGs forming each ECCE and the number of available REs for each ECCE may be listed as shown in Table 8.

TABLE 8

| ECCE | EREG | 1 Tx CRS | 2 Tx CRS | 4 Tx CRS |
|---|---|---|---|---|
| $1^{st}$ ECCE | EREG #0, EREG #4, EREG #8, and EREG #12 | 28 REs | 27 REs | 26 REs |
| $2^{nd}$ ECCE | EREG #1, EREG #5, EREG #9, and EREG #13 | 29 REs | 27 REs | 26 REs |
| $3^{rd}$ ECCE | EREG #2, EREG #6, EREG #10, and EREG #14 | 28 REs | 27 REs | 26 REs |
| $4^{th}$ ECCE | EREG #3, EREG #7, EREG #11, and EREG #15 | 29 REs | 27 REs | 26 REs |

When the legacy PDCCH size is 3, EREGs forming each ECCE and the number of available REs for each ECCE may be listed as shown in Table 9.

TABLE 9

| ECCE | EREG | 1 Tx CRS | 2 Tx CRS | 4 Tx CRS |
|---|---|---|---|---|
| $1^{st}$ ECCE | EREG #0, EREG #4, EREG #8, and EREG #12 | 25 REs | 24 REs | 23 REs |
| $2^{nd}$ ECCE | EREG #1, EREG #5, EREG #9, and EREG #13 | 26 REs | 24 REs | 23 REs |
| $3^{rd}$ ECCE | EREG #2, EREG #6, EREG #10, and EREG #14 | 25 REs | 24 REs | 23 REs |
| $4^{th}$ ECCE | EREG #3, EREG #7, EREG #11, and EREG #15 | 26 REs | 24 REs | 23 REs |

As described above, when modulo 4 is applied to an EREG index value in a single PRB pair forming an EPDCCH set and a single ECCE is formed by grouping 4 EREGs having an identical EREG index, the imbalance in the number of available REs between ECCEs may be overcome.

This may be equally applied when an EREG is indexed based on an OFDM symbol although a cyclic shift is used.

Accordingly, when an EPDCCH set corresponds to a localized type, in the corresponding EPDCCH set formed of a group of M Physical Resource Blocks (PRBs), ECCEs forming the corresponding EPDCCH set may be configured according to the second embodiment as follows.

Even in the case of the second embodiment, according to two schemes of the first embodiment, with respect to M PRBs forming a localized type EPDCCH, ECCEs, from $1^{st}$ ECCE (e.g., an ECCE formed of EREGs #0, #4, #8, and #12 of a corresponding PRB pair according to the second embodiment) of the lowest PRB pair (e.g., a PRB pair having the lowest PRB index) to $4^{th}$ ECCE (e.g., an ECCE formed of EREGs #3, 7, 11, and 15) in a PRB pair having the $M^{th}$ lowest PRB index (that is, the largest PRB index), may be indexed as ECCE #0, ECCE #1, . . . , and ECCE #(4M−1).

Referring again to a diagram (A) of FIG. 10, with respect to M PRBs forming a localized type EPDCCH set, $1^{st}$ ECCE formed of EREGs #0, #4, #8, and #12 in the lowest PRB pair is indexed as ECCE #0, $2^{nd}$ ECCE formed of EREGs #1, #5, #9, and #13 is indexed as ECCE #1, $3^{rd}$ ECCE formed of EREGs #2, #6, #10, and #14 is indexed as ECCE #2, and $4^{th}$ ECCE formed of EREGs #3, #7, #11, and #15 is indexed as ECCE #3. Subsequently, ECCE #4 to ECCE #7 are indexed in a $2^{nd}$ lowest PRB, in the same manner. In this manner, $4^{th}$ ECCE (e.g., an ECCE formed of EREGs #3, #7, #11,and #15 in a corresponding PRB pair) of the corresponding PRB pair having an $M^{th}$ lowest PRB index (e.g., the largest PRB index) may be indexed as ECCE #(4M−1).

As another example, referring again to a diagram (B) of FIG. 10, $1^{st}$ ECCEs of corresponding PRB pairs (e.g., ECCE formed of EREGs #0, #4, #8, and #12 in each PRB pair) are sequentially indexed as ECCE #0 to ECCE #(M−1), first. Then, $2^{nd}$ ECCEs of the PRB pairs are indexed as ECCE #M to ECCE #(2M−1), in the same manner. $3^{rd}$ ECCEs of the PRB pairs are indexed as ECCE #2M to ECCE #(3M−1) and $4^{th}$ ECCEs of the PRB pairs are indexed as ECCE #3M to ECCE #(4M−1), in the same manner.

An ECCE/EREG mapping method for a localized type EPDCCH set that is applicable to a normal CP downlink subframe (e.g., normal subframe) and special subframes 3, 4, and 8(e.g., normal CP), which correspond to the case in which the number of EREGs forming a single ECCE is 4 (that is, N=4), and a corresponding ECCE indexing method, have been described.

In the same manner, an ECCE/EREG mapping method and a corresponding ECCE indexing method may be applied to a localized type EPDCCH set that is configured in an extended CP downlink subframe (e.g., normal subframe), special subframes 1, 2, 6, 7, and 9 (e.g., normal CP), and special subframes 1, 2, 3, 5, and 6 (e.g., extended CP), which correspond to the case in which the number of EREGs forming a single ECCE is 8 (that is, N=8).

That is, according to the first embodiment, from among 16 EREGs forming a PRB pair that forms an EPDCCH set, 8 EREGs are grouped to configure $1^{st}$ ECCE (e.g., EREG #0~EREG #7) and $2^{nd}$ ECCE (e.g., EREG #8~EREG #15), instead of configuring 4 ECCEs by grouping 4 consecutive EREGs. In the same manner, in association with the second embodiment, a single ECCE is formed of 8 EREGs having an identical EREG remainder obtained after applying modulo 2 from among 16 EREGs forming a PRB pair that forms a localized type EPDCCH set, instead of 4 EREGs having an identical EREG remainder obtained after applying modulo 4. That is, in a corresponding PRB pair, $1^{st}$ ECCE is formed of EREGs #0, #2, #4, #6, #8, #10, #12, and #14, and $2^{nd}$ ECCE is formed of EREGs #1, #3, #5, #7, #9, #11, #13, and #15. Based on the above, an ECCE indexing method in the corresponding EPDCCH set indexes ECCEs, from $1^{st}$ ECCE configured in a PRB pair having the lowest PRB index to $2^{nd}$ ECCE configured in a PRB pair having the largest PRB index, with ECCE #0, ECCE #1, . . . , and ECCE #(2M−1), respectively, based on an ECCE/EREG mapping method, in the same manner as the case of N=4.

[Third Embodiment]

As a method of maximizing a frequency diversity gain, which is an important capacity index, when a distributed EPDCCH transmission is executed, the third embodiment transmits ECCEs forming a distributed type EPDCCH set through N distributed EPRBs according to the following two conditions, each ECCE being formed of M EPRBs.

1-1) when N≥M, in each ECCE, $$\frac{N}{M}$$

EREGs are mapped per EPRB. That is, N EREGs forming a corresponding ECCE are mapped through all M EPRBs (EPRB #m, for m=0, 1, 2, . . . , M−1).

1-2) when N<M, in each ECCE, an EREG is mapped per EPRB. That is, N EREGs forming a corresponding ECCE are mapped through a total of N distributed EPRBs. Here, the corresponding N EPRBs are formed of N EPRBs having an interval of $$\frac{M}{N}$$

EPRB, among M EPRBs forming a corresponding EPDCCH set.

For example, when 2 PRB pairs (M=2) are allocated for a distributed type EPDCCH set, for an EPDCCH UE in a normal downlink subframe of a normal CP, the 2 PRB pairs forming the corresponding EPDCCH set may be indexed with EPRB #0 and EPRB #1, sequentially from a PRB pair having a low PRB index. In this instance, the number of EREGs forming a single ECCE in the normal downlink subframe of the normal CP is 4 (N=4) and thus, each ECCE is formed of 4 EREGs obtained by bringing 4/2=2 EREGs in EPRB #0 and 2 EREGs in EPRB #1 together according to the condition 1-1 ).

Figure 11:
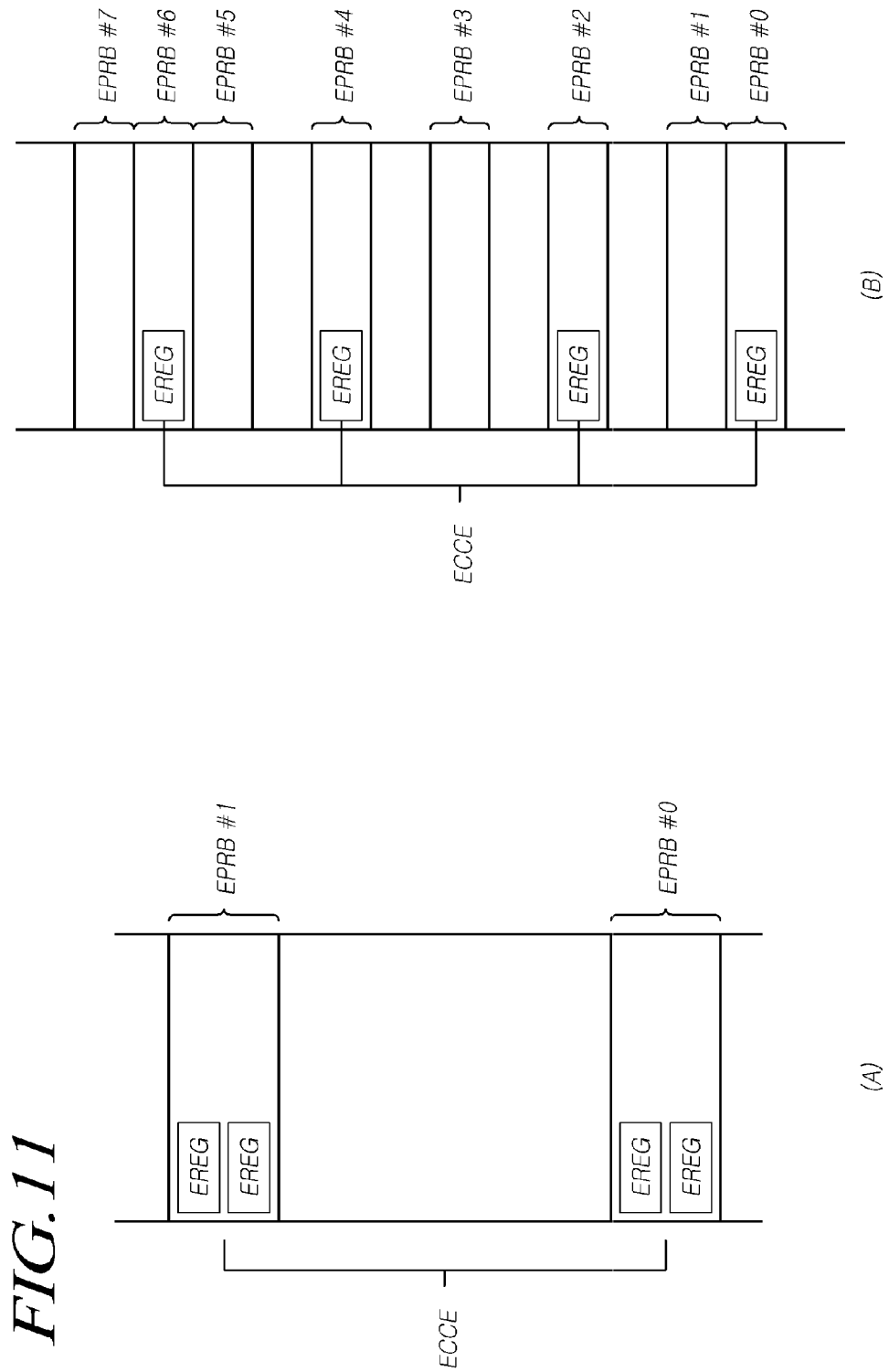
FIG. 11 is a diagram illustrating an ECCE of a distributed type EPDCCH set according to a third embodiment.

A diagram (A) of FIG. 11 illustrates a configuration of an ECCE formed of 2 EPRBs, in a distributed type EPDCCH set, according to the third embodiment.

Referring to the diagram (A) of FIG. 11, a distributed type EPDCCH set is formed of two PRB pairs, that is, EPRB #0 and EPRB #1, and an ECCE is formed of 4 EREGs obtained by bringing 2 EREGs in EPRB #0 and 2 EREGs in EPRB #1 together, according to the condition 1-1 ).

When 8 PRB pairs (M=8) are allocated for a distributed type EPDCCH set, for an EPDCCH UE in a normal downlink subframe of a normal CP, 8 PRB pairs forming the corresponding EPDCCH set may be indexed with EPRB #0, EPRB #1, . . . , and EPRB #7, sequentially from a PRB pair having the lowest PRB index. In this instance, in the same manner, the number of EREGs forming a single ECCE in the normal downlink subframe of the normal CP is 4(N=4) and thus, an ECCE is formed by taking one EREG for each of N=4 EPRBs distributed at intervals of $$\frac{M}{N} = \frac{8}{4} = 2$$

EPRB, according to the condition 1-2 ). That is, in a single ECCE, 4 EREGs used for transmission of a corresponding ECCE are mapped by bringing one from EPRB #0, one from EPRB #2, one from EPRB #4, and one from EPRB #6 together or bringing one from EPRB #1, one from EPRB #3, one from EPRB #5, and one from EPRB #7 together.

FIG. 11 is a diagram illustrating a configuration of an ECCE formed of 8 EPRBs, in a distributed type EPDCCH set, according to the third embodiment.

Referring to FIG. 11, a distributed type EPDCCH set is formed of eight PRBs from EPRB #0 to EPRB #7, and a single ECCE is formed by allocating an EREG to each of EPRB #0, EPRB #2, EPRB #4, and EPRB #6, according to the condition 1-2 ).

[Fourth Embodiment]

To configure a single ECCE in a distributed type EPDCCH set, a method of selecting an EREG from a corresponding EPRB needs to be defined together with the EPRB mapping method described in the third embodiment. The present specification provides an ECCE/EREG mapping method according to the 3 following sub-embodiments by combining the EREG selection method and the EPRB hopping method of the third embodiment.

[First Sub-Embodiment of Fourth Embodiment]

According to a first sub-embodiment, an ECCE is formed of EREGs having an identical index from among EPRBs mapped to form an ECCE according to the third embodiment. That is, to form a single ECCE, $$\frac{N}{M}$$

EREGs are mapped from each EPRB according to the condition 1-1 ) and an EREG is mapped from each EPRB according to the condition 1-2 ). In this instance, an ECCE may be formed by mapping EREGs having an identical index from each EPRB. In this instance, a total of $$\frac{16}{N} \times M$$

ECCEs (ECCE $$\left(ECCE\ \#i, i = 0, 1, 2, \ldots, \frac{16}{N} \times M - 1\right)$$

forming a corresponding EPDCCH set may be indexed in order from the lowest EREG index forming a corresponding ECCE and then in order from the lowest EPRB index. That is, indexing is executed with ECCE #0 from an ECCE having the lowest EREG index among EREGs selected from EPRBs forming a corresponding ECCE according to mapping of EPRBs forming the corresponding ECCE according to the third embodiment, and in the case of ECCEs to which N different EPRBs are mapped as shown in the 1-2) case, when EREG indices selected from EPRBs forming the ECCEs are identical, indexing is executed from an ECCE that is mapped with the lowest EPRB index. That is, EREGs forming ECCE #i that forms the corresponding distributed type EPDCCH set may be configured by Equation 1 and Equation 2.

With respect to i=0, 1, . . . , $$\frac{16}{N} \times M - 1.$$

[Equation 1]
N≥M and ECCE #i is {EREG #n of EPRB #m}, with respect to m=0, 1, . . . , M−1. Here, n=n(i), . . . , $$n(i) + \frac{N}{M} - 1 \text{ and, } n(i) = i \times \frac{N}{M}.$$

[Equation 2]
N<M and ECCE #i is {EREG #n(i) of EPRB #m(a)}. Here, m(a) is $$m(a) = \frac{M}{N}a + \left(i \bmod \frac{M}{N}\right) \text{ and}$$

$$n(i) = \left[i \times \frac{N}{M}\right],$$

with respect to a=0, 1, . . . , N−1. (Here, [x] is the largest integer that is less than x.)

Figure 12:
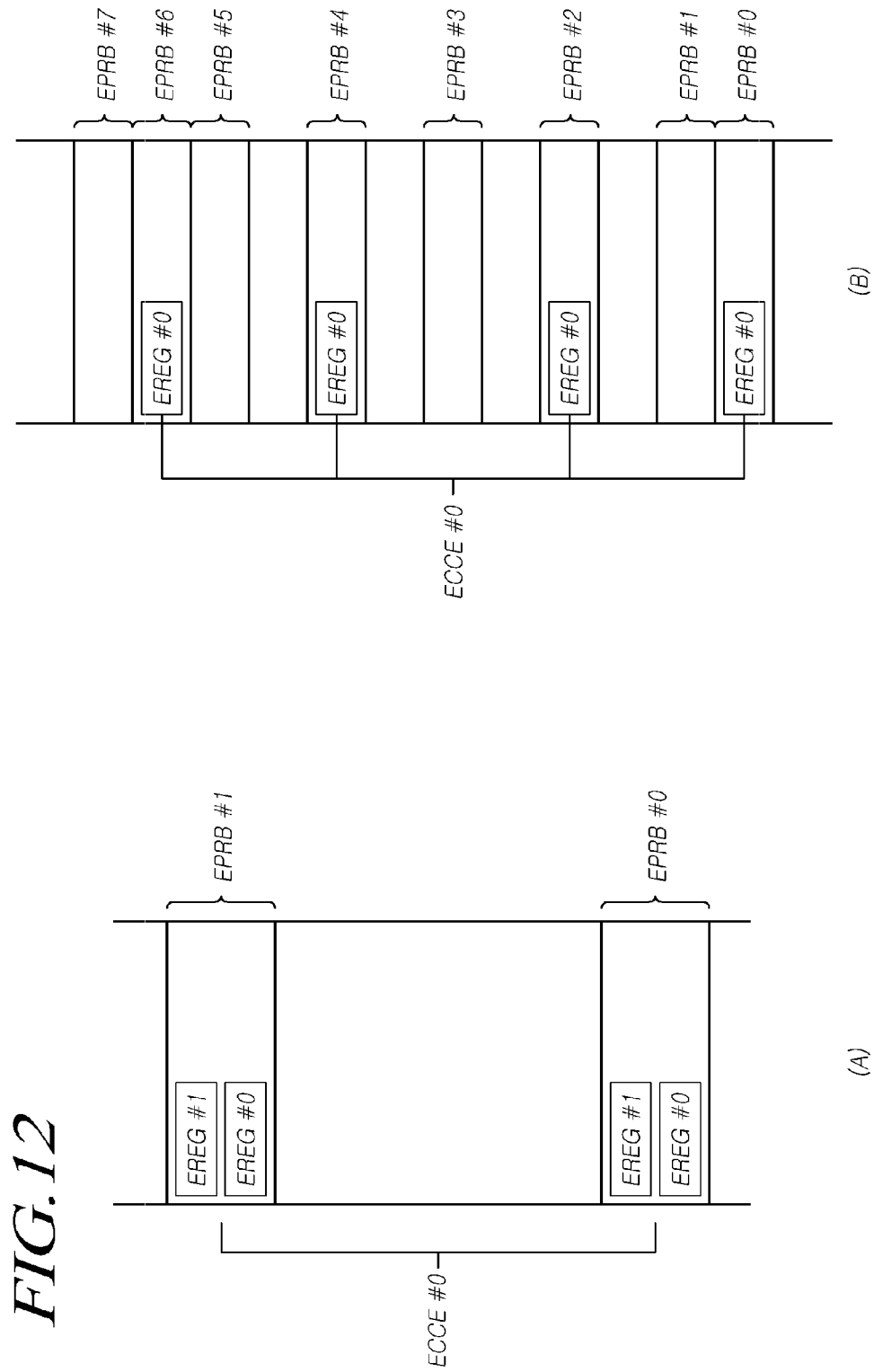
FIG. 12 is a diagram illustrating an ECCE of a distributed type EPDCCH set according to a first fourth embodiment.

FIG. 12 is a diagram of an ECCE of a distributed type EPDCCH set according to a first fourth embodiment.

In FIG. 12, the number N of EREGs forming an ECCE is 4, and the index i of the ECCE is 0.

A diagram (A) of FIG. 12 illustrates a configuration of an ECCE according to Equation 1, and the number M of EPRBs forming an EPDCCH set is 2 with reference to the diagram (A) of FIG. 12. When the parameters are applied to Equation 1, n(i)=i×N/M=0×4/2=0 and n(i)+N/M−1=1. Therefore, ECCE #0 is {EREG #0 and EREG #1 of EPRB #0 and EPRB #1}, and ECCE #0 may be configured by selecting EREG #0 and EREG #1 from EPRB #0 and selecting EREG #0 and EREG #1 from EPRB #1, as shown in the diagram (A) of FIG. 12.

A diagram (B) of FIG. 12 illustrates a configuration of an ECCE according to Equation 2, and the number M of EPRBs forming an EPDCCH set is 8 with reference to the diagram (A) of FIG. 12. When the parameters are applied to Equation 2, n(i)=[0×4/8]=[0]=0 and m(a)=8/4×a+(0 mod 8/4)=2a+0=2a={0, 2, 4, 6 for a=0, 1, 2, 3}. Therefore, ECCE #0 is {EREG #0 of EPRB #0, EPRB #2, EPRB #4, EPRB #6}, and ECCE #0 may be configured by selecting EREG #0 from EPRB #0, selecting EREG #0 from EPRB #2, selecting EREG #0 from EPRB #4, and selecting EREG #0 from EPRB #6.

[Second Sub-Embodiment of Fourth Embodiment]

According to a second sub-embodiment of fourth embodiment, an ECCE is formed of EREGs having shifted indices, from among EPRBs mapped to form an ECCE according to the third embodiment. According to the third embodiment, a hopping size of an EPRB index from which an EREG forming an ECCE is to be selected may be regarded as a single EPRB for the case of 1-1), and may be regarded as $$\frac{M}{N}$$

EPRBs only for the case of 1-2), as described above.

To describe the present embodiment in detail in association with the above, an EREG is selected from each EPRB by hopping over EPRBs based on a hopping size according to the condition of the third embodiment from EREG #0 of EPRB #0, in M EPRBs from EPRB #0 to EPRB #(M−1) forming a distributed type EPDCCH set. In this instance, an EREG index selected from a corresponding EPRB is increased by 1 for each EPRB hopping. In this instance, when the last ERPB (e.g., the largest EPRB) forming the corresponding EPDCCH set appears before an Nth EREG is mapped for configuring an ECCE, the process applies cyclic shifting to return the process to the first EPRB (e.g., the lowest EPRB) so that EREG mapping is continued.

That is, when the hopping size is 1 (e.g., N≥M, N=4 and M=3) according to the third embodiment, mapping is executed by selecting N EREGs through a total of N EPRBs, in a manner of selecting EREG #0 from EPRB #0, selecting EREG #1 from EPRB #1, selecting EREG #2 from EPRB #2, and selecting EREG #3 again from EPRB #0 (When N>M, an EPRB may be selected many times).

When ECCE/EREG mapping in association with a first ECCE formed of N EREGs, is completed in this manner, the process proceeds with a subsequent EPRB, and executes mapping of a second ECCE by hopping over EPRBs based on a hopping size, and selecting one EREG for each corresponding EPRB up to a total of N EREGs by increasing an EREG index by 1. In this manner, the process may execute mapping of EREGs forming an Mth ECCE, from EREG #0 of EPRB #(M−1) which is the last EPRB forming the corresponding EPDCCH set.

When a first turn is completed, all EREGs from EREG #0 to EREG #(N−1) of all EPRBs from EPRB #0 to EPRB #(M−1) forming the corresponding EPDCCH set are used for mapping a corresponding ECCE from ECCE #0 to ECCE# (M−1). Subsequently, a second turn is executed in this manner, beginning from an EREG #N of EPRB #0, and executes ECCE/EREG mapping from ECCE #M to ECCE #(2M−1).

In this manner, when the process is repeated $$\frac{16}{N}$$

turns based on the corresponding N value, $$\frac{16}{N} \times M$$

ECCEs that form the corresponding EPDCCH set may be mapped.

An ECC/EREG mapping method for a distributed type EPDCCH set according to the second sub-embodiment of the fourth embodiment may be expressed by the following Equation 3 and Equation 4.

With respect to i=0, 1, . . . , $$\frac{16}{N} \times M - 1,$$

[Equation 3]
N≥M and ECCE #i is {EREG #n(a) of EPRB #m(a)}. Here, $$m(a) = (i \bmod M) + a - M \times \left\lfloor \frac{(i \bmod M) + a}{M} \right\rfloor \text{ and}$$

$$n(a) = N \times \left\lfloor \frac{i}{M} \right\rfloor + a,$$

with respect to a=0, 1, . . . , N−1. (Here, [x] is the largest integer that is less than x.)

[Equation 4]
N<M and ECCE #i is {EREG #n(a) of EPRB #m(a)}. Here, $$m(a) = (i \bmod M) + \frac{M}{N} \times a - M \times \left\lfloor \frac{(i \bmod M) + a}{M} \right\rfloor \text{ and}$$

$$n(a) = N \times \left\lfloor \frac{i}{M} \right\rfloor + a,$$

with respect to a=0, 1, . . . , N−1 (Here, [x] is the largest integer that is less than x.)

Figure 13:
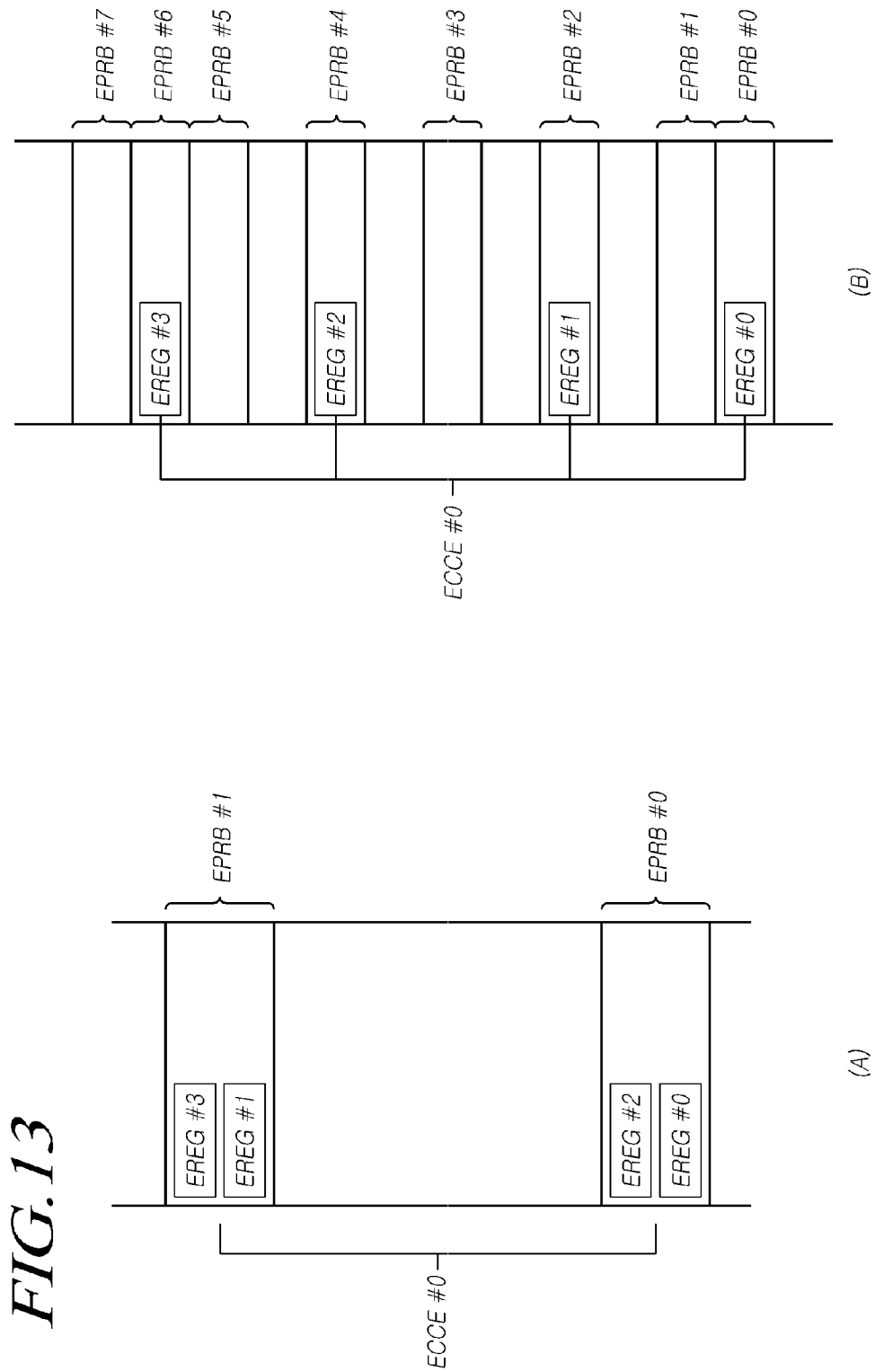
FIG. 13 is a diagram illustrating an ECCE of a distributed type EPDCCH set according to a second fourth embodiment.

FIG. 13 is a diagram of an ECCE of a distributed type EPDCCH set according to the second sub-embodiment of the fourth embodiment.

In FIG. 13, the number N of EREGs forming an ECCE is 4, and the index i of the ECCE is 0.

A diagram (A) of FIG. 13 illustrates a configuration of an ECCE according to Equation 3, and the number M of EPRBs forming an EPDCCH set is 2 with reference to the diagram (A) of FIG. 13. When the parameters are applied to Equation 3, m(0)=0 and n(0)=0 for a=0, m(1)=1 and n(1)=1 for a=1, m(2)=0 and n(2)=2 for a=2, and m(3)=1 and n(a)=3 for a=3. Therefore, ECCE #0 is {EREG #0 of EPRB #0, EREG #1 of EPRB #1, EREG #2 of EPRB #0, and EREG #3 of EPRB #1}, and ECCE #0 may be configured by selecting EREG #0 from EPRB #0, selecting EREG #1 from EPRB #1, selecting EREG #2 from EPRB #0, and selecting EREG #3 from EPRB #1, as shown in the diagram (A) of FIG. 13.

A diagram (B) of FIG. 13 illustrates a configuration of an ECCE according to Equation 4, and the number M of EPRBs forming an EPDCCH set is 8 with reference to the diagram (B) of FIG. 13. When the parameters are applied to Equation 4, m(0)=0 and n(0)=0 for a=0, m(1)=2 and n(1)=1 for a=1, m(2)=4 and n(2)=2 for a=2, and m(3)=6 and n(a)=3 for a=3. Therefore, ECCE #0 is {EREG #0 of EPRB #0, EREG #1 of EPRB #2, EREG #2 of EPRB #4, and EREG #3 of EPRB #6}, and ECCE #0 may be configured by selecting EREG #0 from EPRB #0, selecting EREG #1 from EPRB #2, selecting EREG #2 from EPRB #4, and selecting EREG #3 from EPRB #6, as shown in the diagram (B) of FIG. 13.

[Third Fourth Embodiment]

A third sub-embodiment of the fourth embodiment executes mapping by hopping over EPRBs and selecting one EREG from each corresponding EPRB up to a total of N EREGs in the similar manner as the second sub-embodiment of the fourth embodiment. However, unlike the second sub-embodiment of the fourth embodiment, the third fourth embodiment increases an EREG index by $$\frac{16}{N}$$

based on the N value, as opposed to increasing an index by 1 for each EPRB hopping. That is, an EREG is selected from each EPRB by hopping over EPRBs based on a hopping size according to the third embodiment from EREG #0 of EPRB #0 in M EPRBs from EPRB #0 to EPRB #(M−1) forming a distributed type EPDCCH set.

In this instance, for each EPRB hopping, an EREG index that is selected from a corresponding EPRB is increased by $$\frac{16}{N}$$

based on the N value, as opposed to by 1 as described in the second sub-embodiment of the fourth embodiment. For example, when the number of EPRBs allocated for a distributed type EPDCCH set is 8 (M=8) and the corresponding EPDCCH set is defined in a normal downlink subframe of a normal CP (that is, N=4), the EPRB hopping size is determined to be M/N=2 according to the condition of the third embodiment. In addition, when an ECCE is configured according to the third fourth embodiment, the EREG hopping size for EREGs selected from EPRBs forming each ECCE may be determined to be 16/4=4.

Accordingly, a first ECCE (ECCE #0 ) may be formed of EREG #0 of EPRB #0 , EREG #4 of EPRB #2, EREG #8 of EPRB #4, and EREG #12 of EPRB #6. In the same manner, a second ECCE index is formed of EREG #0 of EPRB #1, EREG #4 of EPRB #3, EREG #8 of EPRB #5, and EREG #12 of EPRB #7. In this manner, ECCE #(M−1) (ECCE #7 in the present example) which is the last ECCE of the first turn and an $M^{th}$ ECCE of the corresponding EPDCCH set, may be formed of EREG #0 of EPRB #7, EREG #4 of EPRB #1, EREG #8 of EPRB #3, and EREG #12 of EPRB #5.

When the first turn is completed as described above, modulo of all EPRBs from EPRB #0 to EPRB #(M−1) forming the corresponding EPDCCH set, that is, all EREGs having an index that becomes a value of 0 when modulo 4 is applied thereto, are used for mapping M ECCEs (8 ECCEs in the present example) from ECCE #0 to ECCE#(M−1).

The second turn begins mapping from ECCE #M which is an (M+1)$^{th}$ ECCE with EREG #1 of EPRB #0 , EREG #5 of EPRB #2, EREG #9 of EPRB #4, and EREG #13 of EPRB #6, and completes mapping by mapping ECCE #(2M−1) which is an 2M$^{th}$ ECCE with EREG #1 of EPRB #7, EREG #5 of EPRB #1, EREG #9 of EPRB #3, and EREG #13 of EPRB #5.

In this manner, when the process is repeated $$\frac{16}{N}$$

turns based on the corresponding N value, $$\frac{16}{N} \times M$$

ECCEs that form the corresponding EPDCCH set may be mapped. In this instance, when the last ERPB (e.g., the largest EPRB) forming the corresponding EPDCCH set appears before an N$^{th}$ EREG is mapped for configuring an ECCE, the process applies cyclic shifting to return the process to the first EPRB (e.g., the lowest EPRB) so that EREG mapping is continued.

An ECC/EREG mapping method for a distributed type EPDCCH set according to the third fourth embodiment may be expressed by the following Equation 5 and Equation 4.

With respect to i=0, 1, . . . , $$\frac{16}{N} \times M - 1,$$

[Equation 5]
N≥M and ECCE #i is {EREG #n(a) of EPRB #m(a)}. Here, $$m(a) = (i \bmod M) + a - M \times \left[\frac{(i \bmod M) + a}{M}\right] \text{ and}$$

$$n(a) = N \times \left[\frac{i}{M}\right] + \frac{16}{N} \times a,$$

with respect to a=0, 1, . . . , N−1. (Here, [x] is the largest integer that is less than x.)

[Equation 6]
N<M and ECCE #i is {EREG #n(a) of EPRB #m(a)}. Here, $$m(a) = (i \bmod M) + \frac{M}{N} \times a - M \times \left[\frac{(i \bmod M) + a}{M}\right] \text{ and}$$

$$n(a) = N \times \left[\frac{i}{M}\right] + \frac{16}{N} \times a,$$

with respect to a=0, 1, . . . , N−1. (Here, [x] is the largest integer that is less than x.)

Figure 14:
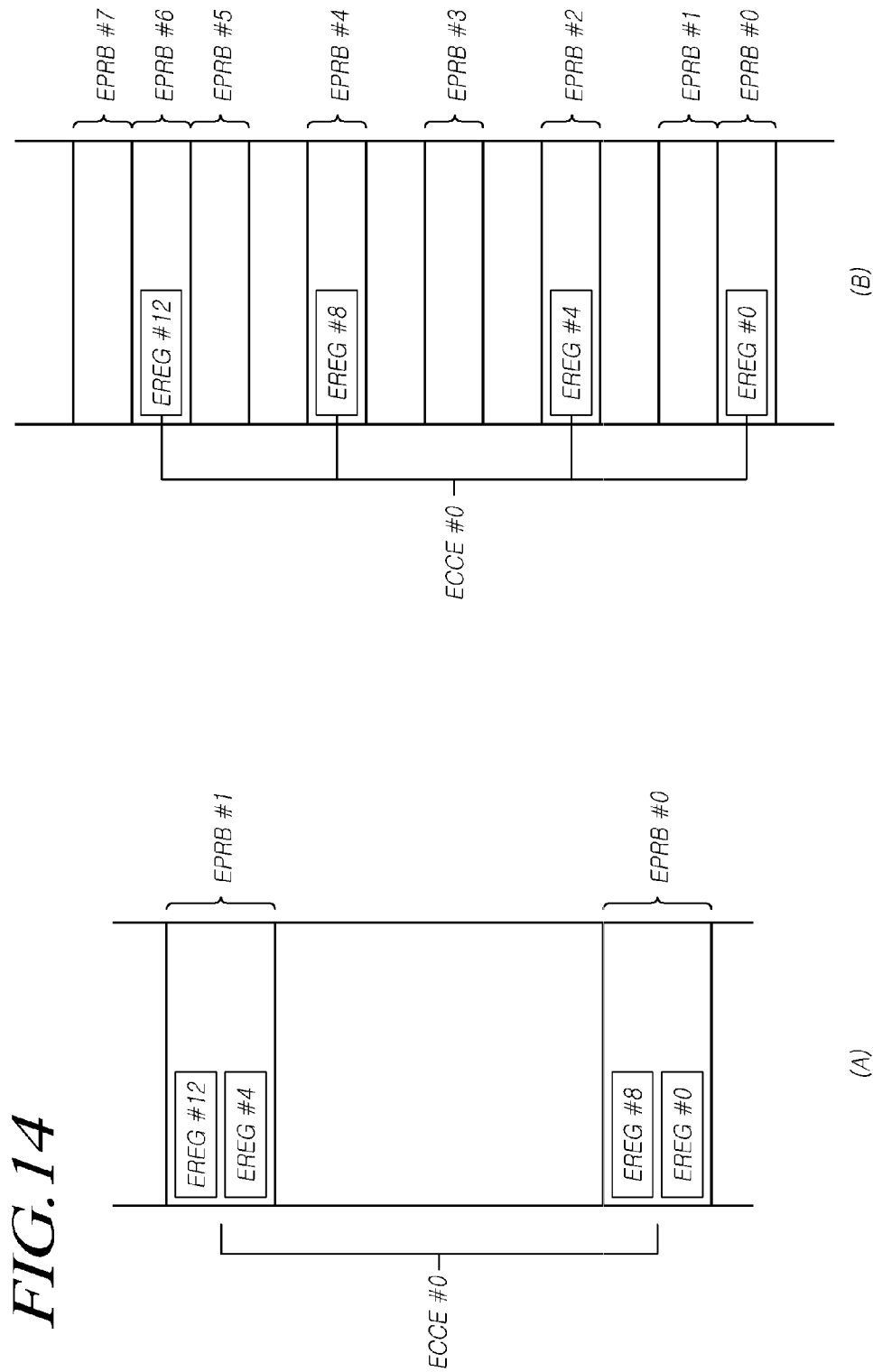
FIG. 14 is a diagram illustrating an ECCE of a distributed type EPDCCH set according to a third fourth embodiment.

FIG. 14 is a diagram of an ECCE of a distributed type EPDCCH set according to the third fourth embodiment.

In FIG. 14, the number N of EREGs forming an ECCE is 4, and the index i of the ECCE is 0.

A diagram (A) of FIG. 14 illustrates a configuration of an ECCE according to Equation 5, and the number M of EPRBs forming an EPDCCH set is 2 with reference to the diagram (A) of FIG. 14. When the parameters are applied to Equation 5, m(0)=0 and n(0)=0 for a=0, m(1)=1 and n(1)=4 for a=1, m(2)=0 and n(2)=8 for a=2, and m(3)=1 and n(a)=12 for a=3. Therefore, ECCE #0 is {EREG #0 of EPRB #0 , EREG #4 of EPRB #1, EREG #8 of EPRB #0 , and EREG #12 of EPRB #1}, and ECCE #0 may be configured by selecting EREG #0 from EPRB #0 , selecting EREG #4 from EPRB #1, selecting EREG #8 from EPRB #0 , and selecting EREG #12 from EPRB #1, as described in the diagram (A) of FIG. 14.

A diagram (B) of FIG. 14 is a diagram illustrating a configuration of an ECCE according to Equation 6, and the number M of EPRBs forming an EPDCCH set is 8 with reference to the diagram (B) of FIG. 14. When the parameters are applied to Equation 6, m(0)=0 and n(0)=0 for a=0, m(1)=2 and n(1)=4 for a=1, m(2)=4 and n(2)=8 for a=2, and m(3)=6 and n(a)=12 for a=3. Therefore, ECCE #0 is {EREG #0 of EPRB #0, EREG #4 of EPRB #2, EREG #8 of EPRB #4, and EREG #12 of EPRB #6}, and ECCE #0 may be configured by selecting EREG #0 from EPRB #0, selecting EREG #4 from EPRB #2, selecting EREG #8 from EPRB #4, and selecting EREG #12 from EPRB #6, as described in the diagram (B) of FIG. 14.

REs that are not available due to a PDCCH control area or a reference signal such as a CRS or the like may exist among REs forming an EREG and thus, there may be imbalance in the number of available REs between EREGs. The number of available REs of ECCEs will be described according to the second sub-embodiment of the fourth embodiment and the third fourth embodiment.

It is assumed that a legacy PDCCH size is 2. Table 3 lists the number of available REs when the legacy PDCCH size is 2.

In this instance, the second sub-embodiment of the fourth embodiment configures an ECCE by increasing an index of an EREG by 1. The number of available REs of ECCEs according to the second fourth embodiment is listed in Table 10.

TABLE 10

| EREG indices forming ECCE | 1 Tx CRS | 2 Tx CRS | 4 Tx CRS |
|---|---|---|---|
| EREG #0~EREG#3 | 25 REs | 23 REs | 22 REs |
| EREG #4~EREG#7 | 28 REs | 27 REs | 25 REs |
| EREG #8~EREG#11 | 30 REs | 28 REs | 28 REs |
| EREG #12~EREG#15 | 31 REs | 30 REs | 29 REs |

Referring to Table 10, for a single transmission antenna port (e.g., 1 Tx CRS), the number of available REs of an ECCE formed of EREGs from EREG #0 to EREG #3 is 25 and the number of available REs of an ECCE formed of EREGs from EREG #12 to EREG #15 is 31 and thus, a difference in the number of available REs between the ECCEs is 6.

In this manner, the number of available REs of ECCEs according to the third fourth embodiment when the legacy PDCCH size is 2 will be described.

TABLE 11

| EREG indices forming ECCE | 1 Tx CRS | 2 Tx CRS | 4 Tx CRS |
|---|---|---|---|
| EREG #0, EREG#4, EREG #8, EREG#12 | 28 REs | 27 REs | 26 REs |
| EREG #1, EREG#5, EREG #9, EREG#13 | 29 REs | 27 REs | 26 REs |
| EREG #2, EREG#6, EREG #10, EREG#14 | 28 REs | 27 REs | 26 REs |
| EREG #3, EREG#7, EREG #11, EREG#15 | 29 REs | 27 REs | 26 REs |

Referring to FIG. 11, for a single transmission antenna port (e.g., 1 Tx CRS), the number of available REs of an ECCE formed of EREG #0, EREG #4, EREG #8, and EREG #12 is 28, and the number of available REs of an ECCE formed of EREG #1, EREG #5, EREG #9, and EREG #13 is 29, and thus, a difference in the number of available REs between the ECCEs is 1. The value is smaller than the difference in the number of available REs between ECCEs according to the second sub-embodiment of the fourth embodiment. In addition, ECCEs according to the third sub-embodiment of the fourth embodiment do not have a difference in the number of available REs, with respect to two transmission antenna ports (e.g., 2 Tx CRS) and four transmission antenna ports (e.g., 4 Tx CRS).

Although the fourth embodiment describes sub-embodiments that are combined with the third embodiment, the present disclosure may not be limited thereto, and the embodiments provided in the fourth embodiment may be independent from the third embodiment.

For example, according to the first sub-embodiment of the fourth embodiment, an ECCE may be configured through EREGs having an identical index, and in the case of an EPDCCH set formed of 8 EPRBs, an ECCE is formed of EREGs (for example, an EREG corresponding to EREG #0 ) having an identical index obtained from EPRB #0, EPRB #2, EPRB #4, and EPRB #6. However, the first sub-embodiment of the fourth embodiment may be independent from the third embodiment. In this instance, a single ECCE may be formed of EREGs (for example, an EREG corresponding to EREG #0 ) obtained from 4 EPRBs having consecutive indices, for example, EPRB #0 , EPRB #1, EPRB #2, and EPRB #3.

Another example of the fourth embodiment, which is independent from the third embodiment, will be described. According to the second sub-embodiment of the fourth embodiment, an ECCE may be formed of EREGs having consecutive indices (for example, EREG #0, EREG #1, EREG #2, and EREG #3 ), and in the case of an EPDCCH set formed of 2 EPRBs, a single ECCE may be configured by selecting EREG #0 from EPRB #0 , selecting EREG #1 from EPRB #1, selecting EREG #2 again from EPRB #0 , and selecting EREG #3 again from EPRB #1. However, the second sub-embodiment of the fourth embodiment may be independent from the third embodiment, and in this instance, an ECCE may be configured by, for example, selecting EREG #0 from EPRB #0, selecting EREG #1, EREG #2, and EREG #3 from EPRB #1.

In the same manner, the third sub-embodiment of the fourth embodiment may be independent from the third embodiment, and may configure an ECCE by selecting EREGs by increasing an index by 16/N without executing hopping. For example, in an EPDCCH set formed of 2 EPRBs, an ECCE may be configured by selecting EREG #0, EREG #4, and EREG #8 from EPRB #0 and selecting EREG #12 from EPRB #1.

Through the above described third and fourth embodiments, an ECCE/EREG mapping method in a distributed type EPDCCH set has been provided, an ECCE/EREG mapping function of the first sub-embodiment of the fourth embodiment has been defined through Equation 1 and Equation 2, an ECCE/EREG mapping function according to the second sub-embodiment of the fourth embodiment has been defined through Equation 3 and Equation 4, and an ECCE/EREG mapping function of the third sub-embodiment of the fourth embodiment has been defined through Equation 5 and Equation 6. However, Equations 1 to 6 are examples of a function to which a corresponding embodiment is applied, and different types of functions including the concepts corresponding to the first sub-embodiment of the fourth embodiment, the second sub-embodiment of the fourth embodiment, and the third sub-embodiment of the fourth embodiment may be available.

Figure 15:
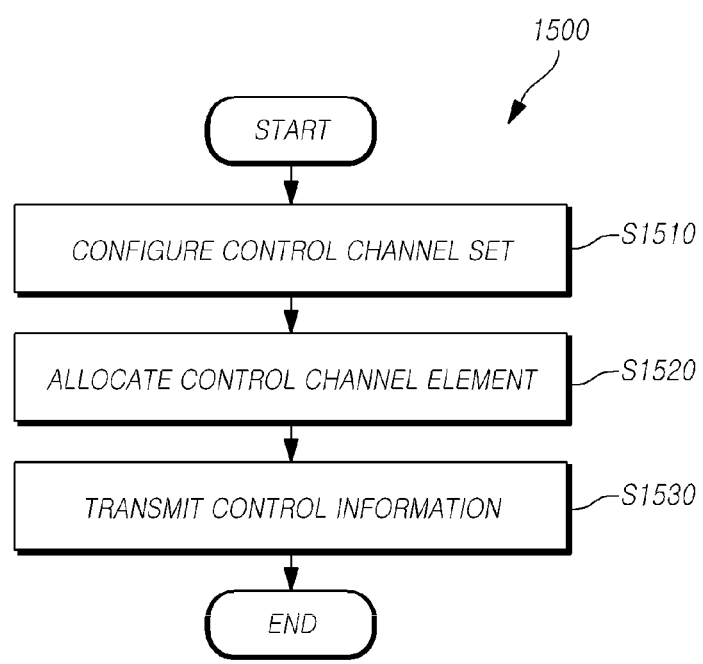
FIG. 15 is a flowchart illustrating a control information transmission method of a transmission/reception point according to an embodiment of the present disclosure.

FIG. 15 is a flowchart illustrating a control information transmission method transmission/reception point according to an embodiment of the present disclosure.

Referring to FIG. 15, a transmission/reception point that transmits, to a UE, control information through a data area of a resource block pair (e.g., Physical Resource Block pair) of a subframe, configures at least one localized downlink control channel (e.g., enhanced Physical Downlink Control Channel) set with respect to a few of resource block pairs, and configures at least one distributed downlink control channel set with respect to another few of resource block pairs, in operation S1510.

The transmission/reception point allocates control channel elements to 4 resource element groups having different indices and having an identical remainder obtained after dividing a corresponding resource element group index by 4 or allocates control channel elements to 8 resource element groups having different indices and having an identical remainder obtained after dividing a corresponding resource element group index by 2, among resource element groups (e.g., enhanced Resource Element Groups) formed of resource elements having an identical index among resource elements to which 16 numbers are repeatedly assigned as indices on a frequency first basis, in each resource block pair, in operation S1520.

In operation S1520, the resource element groups forming a control channel element in a localized downlink control channel set are located in a single resource block pair, and the resource element groups forming a control channel element in a distributed downlink control channel set are located in two or more resource block pairs.

An example of an index assigned to a resource block pair may be understood through the descriptions provided with reference to FIG. 4 to FIG. 9. Referring to FIG. 4 to FIG. 7, EREG indexing is executed using numbers from 1 to 15, based on a frequency first manner. In the embodiment illustrated in FIG. 4, indexing is executed using a symbol-based cyclic shift and thus, the index 12 of a second symbol is indexed to be close to the index 11 of a first symbol. However, in the embodiment illustrated in FIG. 7, indexing is executed without a symbol-based cyclic shift and thus, the index 12 of a second symbol is not indexed to be close to the index 11 of a first symbol.

The transmission/reception point may allocate an ECCE to EREGs having different indices and having an identical remainder obtained after dividing a corresponding EREG index by 4 or allocate an ECCE to EREGs having different indices and having an identical remainder obtained after dividing a corresponding EREG index by 2, among the EREGs.

For example, when an ECCE is allocated to EREGs having different indices and having an identical remainder after dividing a corresponding EREG index by 4, an ECCE may be formed of EREGs #0, #4, #8, and #12, another ECCE may be formed of EREGs #1, #5, #9, and #13, and another ECCE may be formed of EREGs #3, #7, #11, and #15.

As another example, when an ECCE is allocated to EREGs having different indices and having an identical remainder obtained after dividing a corresponding EREG index by 2, an ECCE may be formed of EREGs #0, #2, #4, #6, #8, #10, #12, and #14 and another ECCE may be formed of EREGs #1, #3, #5, #7, #9, #11, #13, and #15.

In operation S1520 that allocates control channel elements to a distributed downlink control channel set, the transmission/reception point may allocate ECCEs by distributing EREGs in resource block pairs so as to maximize a frequency diversity gain. The description provided in the third embodiment may be an example of the method.

Referring again to FIG. 11, the transmission/reception point executes hopping by two PRBs from EPRB #0 in 8 PRB pairs, and selects one EREG from each of EPRB #2, EPRB #4, and EPRB #6, and allocates an ECCE. In the PRB pairs (EPRB #0, EPRB #2, EPRB #4, and EPRB #6 ), the transmission/reception point may allocate an ECCE to EREGs having different indices and having an identical remainder obtained after dividing a corresponding EREG index by 4, as described above or may allocate an ECCE to EREGs having different indices and having an identical remainder obtained after dividing a corresponding EREG index by 2.

Particularly, an ECCE may be configured by selecting EREG #0 from EPRB #0 , selecting EREG #4 from EPRB #2, selecting EREG #8 from EPRB #4, and selecting EREG #12 from EPRB #6. As another example, an ECCE may be configured by selecting EREG #12 from EPRB #0 , selecting EREG #8 from EPRB #2, selecting EREG #4 from EPRB #4, and selecting EREG #0 from EPRB #6.

When the indices of EREGs are limited to 0 to 15, the combination of EREGs having different indices and having an identical remainder obtained after dividing a corresponding EREG index by 4 or the combination of EREGs having different indices and having an identical remainder obtained after dividing a corresponding EREG index by 2 may be limited. Through the combinations, the indices of EREGs allocated to an ECCE may be one of {0, 4, 8, 12}, {1, 5, 9, 13}, {2, 6, 10, 14}, and {3, 7, 11, 15}, or may be one of {0, 2, 4, 6, 8, 10, 12, 14} and {1, 3, 5, 7, 9, 11, 13, 15}.

Referring to FIG. 15 again, the transmission/reception point transmits, to the UE, the control information through at least one of control channel elements in operation S1530.

The control information may be transmitted through an EPDCCH which is a control channel transmitted through the data area 220, and the EPDCCH may be allocated to the at least one control channel element in a resource block pair.

Figure 16:
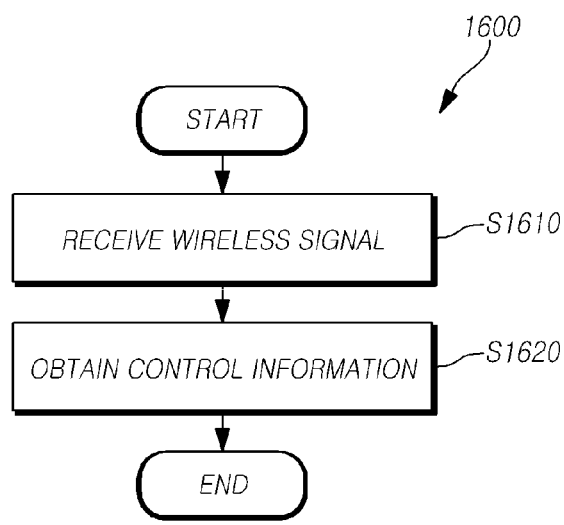
FIG. 16 is a flowchart illustrating a control information reception method of a UE according to another embodiment of the present disclosure.

FIG. 16 is a flowchart illustrating a control information reception method of a UE according to another embodiment of the present disclosure.

Referring to FIG. 16, a UE that receives control information from a transmission/reception point through a data area of a resource block pair (Physical Resource Block pair) of a subframe, receives a wireless signal through at least one of control channel elements that are allocated to 4 resource element groups having different indices and having an identical remainder obtained after dividing a corresponding resource element group index by 4 or that are allocated to 8 resource element groups having different indices and having an identical remainder obtained after dividing a corresponding resource element group index by 2, among resource element groups (e.g., enhanced Resource Element Groups) formed of resource elements having an identical index among resource elements to which 16 numbers are repeatedly assigned as indices based on a frequency first, in each resource block pair, in operation S1610. The UE obtains control information from the received wireless signal, in operation S1620.

At least one localized downlink control channel (e.g., enhanced Physical Downlink Control Channel) set is configured with respect to a few of the resource block pairs and at least one distributed downlink control channel set is configured for another few of the resource block pairs, and in operation 1610, the resource element groups forming a control channel element in the localized downlink control channel set are located in a single resource block pair, and the resource element groups forming a control channel element in the distributed downlink control channel set are located in two or more resource block pairs.

An example of an index assigned to a resource block pair may be understood through the descriptions provided with reference to FIG. 4 to FIG. 9. Referring to FIG. 4 to FIG. 7, EREG indexing is executed using numbers from 1 to 15, based on a frequency first manner. In the embodiment illustrated in FIG. 4, indexing is executed using a symbol-based cyclic shift and thus, the index 12 of a second symbol is indexed to be close to the index 11 of a first symbol. However, in the embodiment illustrated in FIG. 7, indexing is executed without a symbol-based cyclic shift and thus, the index 12 of a second symbol is not indexed to be close to the index 11 of a first symbol.

EREGs having different indices and having an identical remainder obtained after dividing a corresponding EREG index by 4 or EREGs having different indices and having an identical remainder obtained after dividing a corresponding EREG index by 2, among the EREGs, may be allocated for configuring an ECCE.

For example, when an ECCE is allocated to EREGs having different indices and having an identical remainder after dividing a corresponding EREG index by 4, an ECCE may be formed of EREGs #0, #4, #8, and #12, another ECCE may be formed of EREGs #1, #5, #9, and #13, another ECCE may be formed of EREGs #2, #6, #10, and #14, and another ECCE may be formed of EREGs #3, #7, #11, and #15.

As another example, when an ECCE is allocated to EREGs having different indices and having an identical remainder obtained after dividing a corresponding EREG index by 2, an ECCE may be formed of EREGs #0, #2, #4, #6, #8, #10, #12, and #14 and another ECCE may be formed of EREGs #1, #3, #5, #7, #9, #11, #13, and #15.

Control channel elements allocated to a distributed downlink control channel set may be allocated to be distributed in resource block pairs, so as to maximize a frequency diversity gain. The description provided in the third embodiment may be an example of the method.

Referring again to FIG. 11, hopping is executed by two PRBs from EPRB #0 in 8 PRB pairs, and one EREG is selected from each of EPRB #2, EPRB #4, and EPRB #6 for configuring an ECCE. In the PRB pairs (e.g., EPRB #0 , EPRB #2, EPRB #4, and EPRB #6 ), an ECCE may be allocated to EREGs having different indices and having an identical remainder obtained after dividing a corresponding EREG index by 4, as described above, or an ECCE may be allocated to EREGs having different indices and having an identical remainder obtained after dividing a corresponding EREG index by 2.

Particularly, an ECCE may be configured by selecting EREG #0 from EPRB #0, selecting EREG #4 from EPRB #2, selecting EREG #8 from EPRB #4, and selecting EREG #12 from EPRB #6. As another example, an ECCE may be configured by selecting EREG #12 from EPRB #0, selecting EREG #8 from EPRB #2, selecting EREG #4 from EPRB #4, and selecting EREG #0 from EPRB #6.

When the indices of EREGs are limited to 0 to 15, the combination of EREGs having different indices and having an identical remainder obtained after dividing a corresponding EREG index by 4 or the combination of EREGs having different indices and having an identical remainder obtained after dividing a corresponding EREG index by 2 may be limited. Through the combinations, the indices of EREGs allocated to an ECCE may be one of {0, 4, 8, 12}, {1, 5, 9, 13}, {2, 6, 10, 14}, and {3, 7, 11, 15}, or may be one of {0, 2, 4, 6, 8, 10, 12, 14}, and {1, 3, 5, 7, 9, 11, 13, 15}.

Figure 17:
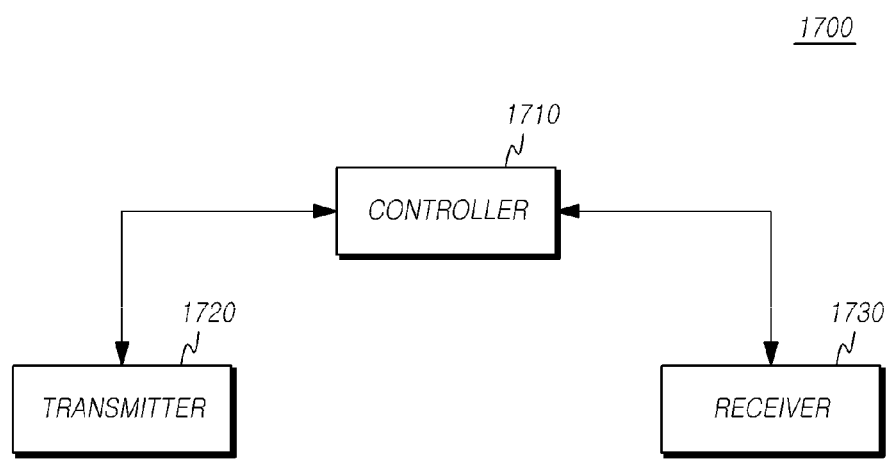
FIG. 17 is a diagram illustrating a configuration of a transmission/reception point according to another embodiment of the present disclosure.

FIG. 17 is a diagram illustrating a configuration of a transmission/reception point according to another embodiment of the present disclosure.

Referring to FIG. 17, a transmission/reception point 1700 that transmits control information to a UE through a data area of resource block pairs (e.g., Physical Resource Block pair) of a subframe may include a controller 1710, a transmitter 1702, a receiver 1730, and the like.

The controller 1710 configures at least one localized downlink control channel (e.g., enhanced Physical Downlink Control Channel) set with respect to a few of the resource block pairs, and configures at least one distributed downlink control channel set with respect to another few of the resource block pairs, and allocates control channel elements to 4 resource element groups having different indices and having an identical remainder obtained after dividing a corresponding resource element group index by 4 or allocates control channel elements to 8 resource element groups having different indices and having an identical remainder obtained after dividing a corresponding resource element group index by 2, among resource element groups (e.g., enhanced Resource Element Groups) formed of resource elements having an identical index among resource elements to which 16 numbers are repeatedly assigned as indices based on a frequency first, in each resource block pair.

The controller 1710 controls the resource element groups forming a control channel element in a localized downlink control channel set to be located in a single resource block pair. The controller 1710 controls the resource element groups forming a control channel element in a distributed downlink control channel set to be located in two or more resource block pairs.

When the indices of EREGs are limited to 0 to 15, the combination of EREGs having different indices and having an identical remainder obtained after dividing a corresponding EREG index by 4 or the combination of EREGs having different indices and having an identical remainder obtained after dividing a corresponding EREG index by 2 may be limited. Through the combinations, the indices of EREGs allocated to an ECCE may be one of {0, 4, 8, 12}, {1, 5, 9, 13}, {2, 6, 10, 14}, and {3, 7, 11, 15}, or may be one of {0, 2, 4, 6, 8, 10, 12, 14}, and {1, 3, 5, 7, 9, 11, 13, 15}.

In addition, the controller 1710 controls general operations of a transmission/reception point in association with an ECCE/EREG mapping method for EPDCCH transmission and ECCE indexing in localized and distributed type EPDCCH sets, which are required for implementing the present disclosure.

The transmitter 1720 transmits control information to the UE through at least one of control channel elements.

The transmitter 1720 and the receiver 1730 may be used for transmitting and receiving a signal or a message, data, and information required for implementing the above described present disclosure, to/from a UE.

Figure 18:
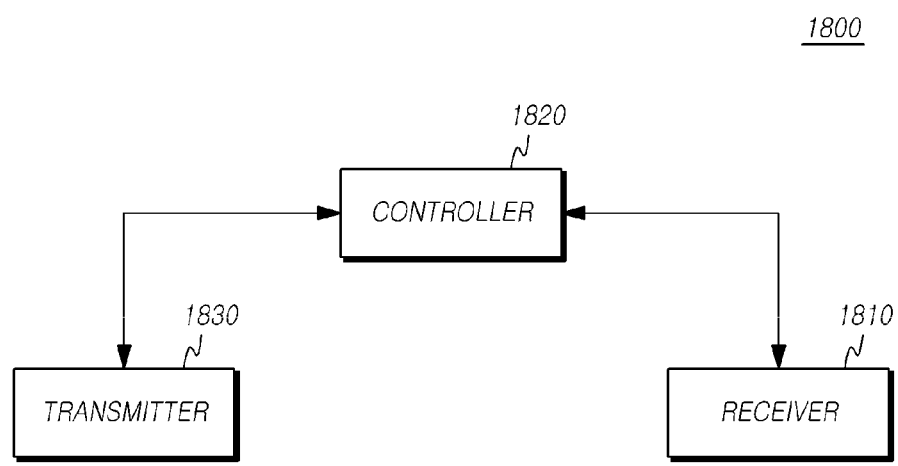
FIG. 18 is a diagram illustrating a configuration of a UE according to another embodiment of the present disclosure.

FIG. 18 is a diagram illustrating a configuration of a UE according to another embodiment of the present disclosure.

Referring to FIG. 18, a UE 1800 that receives control information from a transmission/reception point through a data area of resource block pairs (e.g., Physical Resource Block pair) of a subframe may include a receiver 1810, a controller 1820, a transmitter unit 1830, and the like.

The receiver 1810 receives a wireless signal through at least one of control channel elements that are allocated to 4 resource element groups having different indices and having an identical remainder obtained after dividing a corresponding resource element group index by 4 or that area allocated to 8 resource element groups having different indices and having an identical remainder obtained after dividing a corresponding resource element group index by 2, among resource element groups (e.g., enhanced Resource Element Groups) formed of resource elements having an identical index among resource elements to which 16 numbers are repeatedly assigned as indices based on a frequency first, in each resource block pair.

Here, at least one localized downlink control channel (e.g., enhanced Physical Downlink Control Channel) set is configured with respect to a few of the resource block pairs and at least one distributed downlink control channel set is configured for another few of the resource block pairs, and the resource element groups forming the control channel element in the localized downlink control channel set are located in a single resource block pair, and the resource element groups forming the control channel element in the distributed downlink control channel set are located in two or more resource block pairs.

When the indices of EREGs are limited to 0 to 15, the combination of EREGs having different indices and having an identical remainder obtained after dividing a corresponding EREG index by 4 or the combination of EREGs having different indices and having an identical remainder obtained after dividing a corresponding EREG index by 2 may be limited. Through the combinations, the indices of EREGs allocated to an ECCE may be one of {0, 4, 8, 12}, {1, 5, 9, 13}, {2, 6, 10, 14}, and {3, 7, 11, 15}, or may be one of {0, 2, 4, 6, 8, 10, 12, 14}, and {1, 3, 5, 7, 9, 11, 13, 15}.

The controller 1820 obtains control information from the wireless signal received through the receiver 1810. In addition, the controller 1820 controls general operations of a UE in association with an ECCE/EREG mapping method for EPDCCH reception and ECCE indexing in localized and distributed type EPDCCH sets, which are required for implementing the present disclosure.

The transmitter 1830 and the receiver 1810 may be used for transmitting and receiving a signal or a message, data, and information required for implementing the above described present disclosure.

The content associated with the standard, mentioned in the above described embodiments has been omitted to simply the description of the present specifications, but it may be a part of the present specifications. Therefore, when a part of the content related to the standard is added to the present specifications or is specified in claims, it should be construed as a part of the present disclosure.

Particularly, the documents attached herein are a part of previously publicized documents and constitutes a part of the present specifications. Therefore, when a part of the content and documents associated with the standard is added to the present specifications or is specified in claims, it should be construed as a part of the present disclosure.

Although the embodiments of the present disclosure have been described for illustrative purposes, those skilled in the art will appreciate that various modifications, additions and substitutions are possible, without departing from the scope and spirit of the invention. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

The invention claimed is:

1. A method for a transmission/reception point to transmit control information to a User Equipment (UE) through a data area of resource block pairs of a subframe where the resource block pairs including physical resource block pairs, the method comprising:

configuring at least one localized downlink control channel set with respect to a few of the resource block pairs where the at least one localized downlink control channel includes an enhanced physical downlink control channel, and configuring at least one distributed downlink control channel set with respect to another few of the resource block pairs;

allocating control channel elements to 4 resource element groups having different indices and having an identical remainder obtained after dividing a corresponding resource element group index by 4 or allocating the control channel elements to 8 resource element groups having different indices and having an identical remainder obtained after dividing a corresponding resource element group index by 2, among resource element groups formed of resource elements having an identical index among resource elements to which 16 numbers are repeatedly assigned as indices on a frequency first basis, in each resource block pair wherein the resource element groups include enhanced resource element groups, resource element groups forming a control channel element in the localized downlink control channel set are located in a single resource block pair, and resource element groups forming a control channel element in the distributed downlink control channel set are located in two or more resource block pairs; and transmitting, to the User Equipment, control information through at least one of the control channel elements.

2. The method as claimed in claim 1, wherein the allocating control channel elements comprises:

distributing the resource element groups in the resource block pairs so as to maximize a frequency diversity gain; and allocating the control channel elements.

3. The method as claimed in claim 1, wherein the indices of the resource element groups that are allocated to the control channel elements are $\{0, 4, 8, 12\}$, $\{1, 5, 9, 13\}$, $\{2, 6, 10, 14\}$, and $\{3, 7, 11, 15\}$, respectively.

4. The method as claimed in claim 1, wherein the indices of the resource element groups that are allocated to the control channel elements are $\{0, 2, 4, 6, 8, 10, 12, 14\}$ and $\{1, 3, 5, 7, 9, 11, 13, 15\}$, respectively.

5. A method for a User Equipment (UE) to receive control information from a transmission/reception point through a data area of resource block pairs of a subframe where the resource block pairs include physical resource block pairs, the method comprising:

receiving a wireless signal through at least one of control channel elements that are allocated to 4 resource element groups having different indices and having an identical remainder obtained after dividing a corresponding resource element group index by 4 or that are allocated to 8 resource element groups having different indices and having an identical remainder obtained after dividing a corresponding resource element group index by 2, among resource element groups formed of resource elements having an identical index among resource elements to which 16 numbers are repeatedly assigned as indices on a frequency first basis, in each resource block pair wherein the resource element groups includes enhanced resource element groups, a localized downlink control channel includes enhanced Physical Downlink Control Channel, at least one localized downlink control channel set is configured with respect to a few of the resource block pairs, at least one distributed downlink control channel set is configured with respect to another few of the resource block pairs, resource element groups forming a control channel element in the localized downlink control channel set are located in a single resource block pair, and resource element groups forming a control channel element in the distributed downlink control channel set are located in two or more resource block pairs; and obtaining the control information from the wireless signal.

6. The method as claimed in claim 5, wherein the control channel elements are allocated to the distributed downlink control channel set by distributing the resource element groups in the resource block pairs, so as to maximize a frequency diversity gain.

7. The method as claimed in claim 5, wherein the indices of the resource element groups that are allocated to the control channel elements are $\{0, 4, 8, 12\}$, $\{1, 5, 9, 13\}$, $\{2, 6, 10, 14\}$, and $\{3, 7, 11, 15\}$, respectively.

8. The method as claimed in claim 5, wherein the indices of the resource element groups that are allocated to the control channel elements are $\{0, 2, 4, 6, 8, 10, 12, 14\}$ and $\{1, 3, 5, 7, 9, 11, 13, 15\}$, respectively.

9. A User Equipment (UE) that receives control information from a transmission/reception point through a data area of resource block pairs of a subframe where the resource block pairs include physical resource block pairs, the User Equipment comprising:

a receiver configured to receive a wireless signal through at least one of control channel elements that are allocated to 4 resource element groups having different indices and having an identical remainder obtained after dividing a corresponding resource element group index by 4 or allocated to 8 resource element groups having different indices and having an identical remainder obtained after dividing a corresponding resource element group index by 2, among resource element groups formed of resource elements having an identical index among resource elements to which 16 numbers are repeatedly assigned as indices on a frequency first basis, in each resource block pair wherein the resource element groups include enhanced resource element groups, a localized downlink control channel includes an enhanced physical downlink control channel, at least one localized downlink control channel set is configured with respect to a few of the resource block pairs, at least one distributed downlink control channel set is configured for another few of the resource block pairs, resource element groups forming a control channel element in the localized downlink control channel set are located in a single resource block pair, and resource element groups forming a control channel element in the distributed downlink control channel set are located in two or more resource block pairs; and a controller configured to obtain the control information from the wireless signal.

10. The User Equipment as claimed in claim 9, wherein the control channel elements are allocated to the distributed downlink control channel set after distributing the resource element groups in the resource block pairs, so as to maximize a frequency diversity gain.

11. The method as claimed in claim 9, wherein the indices of the resource element groups that are allocated to the control channel elements are {0, 4, 8, 12}, {1, 5, 9, 13}, {2, 6, 10, 14}, and {3, 7, 11, 15}, respectively.

12. The method as claimed in claim 9, wherein the indices of the resource element groups that are allocated to the control channel elements are {0, 2, 4, 6, 8, 10, 12, 14} and {1, 3, 5, 7, 9, 11, 13, 15}, respectively.

* * * * *